US009992351B2

United States Patent
Li et al.

(10) Patent No.: US 9,992,351 B2
(45) Date of Patent: Jun. 5, 2018

(54) RECHARGING METHOD FOR VIRTUAL IDENTITY MODULE, AND DEVICE

(71) Applicant: Huawei Technologies Co., Ltd., Shenzhen (CN)

(72) Inventors: Zijun Li, Shenzhen (CN); Guoqiang Rong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/035,168

(22) PCT Filed: Nov. 8, 2013

(86) PCT No.: PCT/CN2013/086795
§ 371 (c)(1),
(2) Date: May 6, 2016

(87) PCT Pub. No.: WO2015/066900
PCT Pub. Date: May 14, 2015

(65) Prior Publication Data
US 2016/0286052 A1 Sep. 29, 2016

(51) Int. Cl.
*H04M 15/00* (2006.01)
*H04W 4/24* (2018.01)
(Continued)

(52) U.S. Cl.
CPC ...... *H04M 15/723* (2013.01); *H04L 12/1457* (2013.01); *H04L 12/1467* (2013.01);
(Continued)

(58) Field of Classification Search
CPC .. H04M 15/723; H04M 15/71; H04M 15/856; H04W 4/02
(Continued)

(56) References Cited

U.S. PATENT DOCUMENTS

| 2006/0004656 | A1* | 1/2006 | Lee | G06Q 20/04 |
| | | | | 705/39 |
| 2009/0132819 | A1* | 5/2009 | Lu | G06Q 20/10 |
| | | | | 713/169 |
| 2010/0153249 | A1* | 6/2010 | Yuan | G06Q 20/02 |
| | | | | 705/34 |
| 2010/0210304 | A1 | 8/2010 | Huslak | |

(Continued)

FOREIGN PATENT DOCUMENTS

| CN | 101222712 A | 7/2008 |
| CN | 101222723 A | 7/2008 |

(Continued)

*Primary Examiner* — Cong Tran
(74) *Attorney, Agent, or Firm* — Leydig, Voit & Mayer, Ltd.

(57) ABSTRACT

Embodiments of the present disclosure provide a recharging method for a virtual identity module, and a device. A first recharge request that is sent by user equipment and carries user account information and recharge information is received; a to-be-recharged virtual identity module and a recharge amount are determined according to the recharge information; a second recharge request is sent to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module. Recharging manners are diversified, and a recharging process is more flexible and convenient.

12 Claims, 15 Drawing Sheets

(51) Int. Cl.
*H04L 12/14* (2006.01)
*H04M 17/02* (2006.01)
*H04M 17/00* (2006.01)
*H04W 4/02* (2018.01)

(52) U.S. Cl.
CPC ......... *H04M 15/71* (2013.01); *H04M 15/856* (2013.01); *H04M 15/882* (2013.01); *H04M 17/02* (2013.01); *H04M 17/103* (2013.01); *H04M 17/20* (2013.01); *H04M 17/204* (2013.01); *H04W 4/02* (2013.01); *H04W 4/24* (2013.01)

(58) Field of Classification Search
USPC ..... 455/406, 414.1, 403; 705/34–35, 39, 44, 705/405, 61
See application file for complete search history.

(56) References Cited

U.S. PATENT DOCUMENTS

| | | | |
|---|---|---|---|
| 2010/0311402 | A1 | 12/2010 | Srinivasan et al. |
| 2010/0311404 | A1 | 12/2010 | Shi et al. |
| 2010/0311444 | A1 | 12/2010 | Shi et al. |
| 2011/0145146 | A1* | 6/2011 | You ................ G06Q 20/28 705/44 |
| 2013/0210382 | A1 | 8/2013 | Korkiakoski et al. |

FOREIGN PATENT DOCUMENTS

| | | |
|---|---|---|
| CN | 102263867 A | 11/2011 |
| CN | 102461271 A | 5/2012 |
| KR | 101030896 B1 | 4/2011 |
| KR | 20120097525 A | 9/2012 |
| KR | 20120100502 A | 9/2012 |
| WO | WO 2009158420 A1 | 12/2009 |

* cited by examiner

RECHARGING METHOD FOR VIRTUAL IDENTITY MODULE, AND DEVICE

CROSS-REFERENCE TO RELATED APPLICATION

This application is a National Stage of International Patent Application No. PCT/CN2013/086795, filed on Nov. 8, 2013, which is hereby incorporated by reference in its entirety.

TECHNICAL FIELD

Embodiments of the present disclosure relate to mobile communications technologies, and in particular, to a recharging method for a virtual identity module, and a device.

BACKGROUND

In a wireless communications system, user equipment needs to be equipped with a user identity module, which is referred to as a subscriber identity module (SIM) in the Global System for Mobile Communications (GSM for short) standard, as a user identity module (UIM for short) in the Code Division Multiple Access (CDMA for short) standard, and as a universal subscriber identity module (USIM for short) in the Universal Mobile Telecommunications System (UMTS for short) standard. Currently, the foregoing user identity module exists in a form of a physical card, and the user equipment can be used only after the card is inserted into the user equipment.

With development of technologies, a virtual identity module has been introduced, that is, a user identity module in a form of data, where a card in a physical form does not need to be inserted into a mobile phone, and instead, content of the user identity module in a form of data is downloaded and stored in a secure storage area of the mobile phone, to achieve a same effect as that of a physical SIM card. In addition, use of the virtual identity module does not rely on a slot that is reserved for a SIM card in a process of manufacturing a mobile phone, and multiple virtual identity modules can be used in one mobile phone more conveniently.

In a current solution, a user obtains multiple virtual identity modules directly from operations support systems of different operators by using user equipment, or obtains one or more virtual identity modules directly from one operator. When a fund in a virtual identity module is insufficient, the user recharges the virtual identity module by using an operations support system, resulting in a monotonous recharging manner, a lack of flexibility, and low convenience.

SUMMARY

In view of this, embodiments of the present disclosure provide a recharging method for a virtual identity module, and a device, so that recharging for the virtual identity module is more flexible.

According to a first aspect, the present disclosure provides a recharging method for a virtual identity module, including:

receiving a first recharge request that is sent by user equipment and carries user account information and recharge information;

determining a to-be-recharged virtual identity module and a recharge amount according to the recharge information; and sending a second recharge request to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module.

With reference to the first aspect, in a first possible implementation manner of the first aspect, the recharge information includes identity information of the to-be-recharged virtual identity module and recharge amount information; and the determining a to-be-recharged virtual identity module and a recharge amount according to the recharge information includes:

determining the to-be-recharged virtual identity module according to the identity information of the to-be-recharged virtual identity module; and determining the recharge amount according to the recharge amount information.

With reference to the first aspect, in a second possible implementation manner of the first aspect, the recharge information is a recharge recommendation description identifier determined by the user equipment; and the determining a to-be-recharged virtual identity module and a recharge amount according to the recharge information includes:

determining recharge recommendation description information according to the recharge recommendation description identifier determined by the user equipment, where the recharge recommendation description information includes identity information of the to-be-recharged virtual identity module and recharge amount information;

determining the to-be-recharged virtual identity module according to the identity information of the to-be-recharged virtual identity module; and determining the recharge amount according to the recharge amount information.

With reference to the second possible implementation manner of the first aspect, in a third possible implementation manner of the first aspect, before the receiving a first recharge request that is sent by user equipment and carries user account information and recharge information, the method further includes:

receiving location information sent by the user equipment, where the location information is used to indicate a location of the user equipment;

determining, according to the location information, that the to-be-recharged virtual identity module is a virtual identity module that is available at the location of the user equipment or a virtual identity module whose charge is optimal; and when a fund of the to-be-recharged virtual identity module is insufficient, sending the recharge recommendation description identifier and the recharge recommendation description information to the user equipment, so that the user equipment determines the recharge information according to the recharge recommendation description identifier and the recharge recommendation description information.

With reference to the second possible implementation manner of the first aspect, in a fourth possible implementation manner of the first aspect, before the receiving a first recharge request that is sent by user equipment and carries user account information and recharge information, the method further includes:

when it is detected that a first virtual identity module corresponding to the user account has not been in use within a preset time period, and a balance of a second virtual identity module corresponding to the user account is insufficient, sending the recharge recommendation description identifier and the recharge recommendation description information to the user equipment, so that the user equipment determines the recharge information according to the recharge recommendation description identifier and the recharge recommendation description information, where the second virtual identity module is the to-be-recharged virtual identity module, and the recharge recommendation description information includes an identifier of the first virtual identity module; and before the initiating a second recharge request to an operations support system of the to-be-recharged virtual identity module, the method further includes:

sending a fund transfer-out request to an operations support system of the first virtual identity module, where the fund transfer-out request carries the user account information and a transfer-out amount, and the transfer-out amount is equal to the recharge amount, so that the operations support system of the first virtual identity module transfers the transfer-out amount to the account corresponding to the user account information.

With reference to the second possible implementation manner of the first aspect, in a fifth possible implementation manner of the first aspect, before the receiving a first recharge request that is sent by user equipment and carries user account information and recharge information, the method further includes:

when the to-be-recharged virtual user identity module has a favorable charge rate, and a balance of the to-be-recharged virtual user identity module is lower than a preset amount, sending the recharge recommendation description identifier and the recharge recommendation description information to the user equipment, so that the user equipment determines the recharge information according to the recharge recommendation description identifier and the recharge recommendation description information.

With reference to any one of the second to the fifth possible implementation manners of the first aspect, in a sixth possible implementation manner of the first aspect, after the sending the recharge recommendation description identifier and the recharge recommendation description information to the user equipment, the method further includes:

saving a relationship between the recharge recommendation description identifier and the recharge recommendation description information; and the determining recharge recommendation description information according to the recharge recommendation description identifier determined by the user equipment includes:

determining the recharge recommendation description information according to the recharge recommendation description identifier determined by the user equipment, and the relationship between the recharge recommendation description identifier and the recharge recommendation description information.

With reference to the first aspect or any one of the first to the sixth possible implementation manners of the first aspect, in a seventh possible implementation manner of the first aspect, after the sending a second recharge request to an operations support system of the to-be-recharged virtual identity module, the method further includes:

receiving a response message that is returned by the operations support system of the to-be-recharged virtual identity module after recharging is successful, and recording, according to the response message, a balance of the account corresponding to the user account information after recharge and a recharged account balance of the to-be-recharged virtual identity module in the operations support system; and sending a recharge result to the user equipment, where the recharge result includes an identifier and a balance of the recharged virtual identity module.

According to a second aspect, an embodiment of the present disclosure provides a recharging method for a virtual identity module, including:

determining recharge information, where the recharge information is used to determine a to-be-recharged virtual identity module and a recharge amount;

sending, to a virtual identity module serving device, a first recharge request that carries user account information and the recharge information, so that the virtual identity module serving device sends, to an operations support system of the to-be-recharged virtual identity module, a second recharge request that carries the recharge amount; and receiving a recharge result sent by the virtual identity module serving device.

With reference to the second aspect, in a first possible implementation manner of the second aspect, the determining recharge information includes:

acquiring a recharge operation instruction input by a user, and determining the recharge information according to the recharge operation instruction, where the recharge information includes identity information of the to-be-recharged virtual identity module and recharge amount information.

With reference to the second aspect, in a second possible implementation manner of the second aspect, the recharge information is a recharge recommendation description identifier determined by user equipment, where the recharge recommendation description identifier is used to identify recharge recommendation description information, and the recharge recommendation description information includes an identifier of the to-be-recharged virtual identity module and recharge amount information.

With reference to the second possible implementation manner of the second aspect, in a third possible implementation manner of the second aspect, before the determining recharge information, the method further includes:

detecting a geographical location of the user equipment, and when the geographical location of the user equipment changes, sending location information to the virtual identity module serving device, where the location information is used to indicate a location of the user equipment, so that the virtual identity module serving device determines, according to the location information, that the to-be-recharged virtual identity module is a virtual identity module that is available at the location of the user equipment or a virtual identity module whose charge is optimal; and the determining recharge information includes:

receiving the recharge recommendation description identifier and the recharge recommendation description information that are sent by the virtual identity module serving device when a fund of the to-be-recharged virtual identity module is insufficient;

presenting the recharge recommendation description information sent by the virtual identity module serving device;

receiving a selection input that is made by a user according to the recharge recommendation description information sent by the virtual identity module serving device; and determining a recharge recommendation description identifier of recharge recommendation description information corresponding to the selection input as the recharge information.

With reference to the second possible implementation manner of the second aspect, in a fourth possible implementation manner of the second aspect, the determining recharge information includes:

receiving the recharge recommendation description identifier and the recharge recommendation description information that are sent by the virtual identity module serving device, where the recharge recommendation description information includes an identifier of a first virtual identity module and an identifier of a second virtual identity module that are corresponding to a user account, where the first virtual identity module has not been in use within a preset time period, the to-be-recharged virtual identity module is the second virtual identity module corresponding to the user account, and a balance of the second virtual identity module is insufficient;

presenting the recharge recommendation description information sent by the virtual identity module serving device;

receiving a selection input that is made by a user according to the recharge recommendation description information sent by the virtual identity module serving device; and determining a recharge recommendation description identifier of recharge recommendation description information corresponding to the selection input as the recharge information.

With reference to the second possible implementation manner of the second aspect, in a fifth possible implementation manner of the second aspect, the determining recharge information includes:

receiving the recharge recommendation description identifier and the recharge recommendation description information that are sent by the virtual identity module serving device when the to-be-recharged virtual user identity module has a favorable charge rate, and a balance of the to-be-recharged virtual user identity module is lower than a preset amount;

presenting the recharge recommendation description information sent by the virtual identity module serving device;

receiving a selection input that is made by a user according to the recharge recommendation description information sent by the virtual identity module serving device; and determining a recharge recommendation description identifier of recharge recommendation description information corresponding to the selection input as the recharge information.

According to a third aspect, the present disclosure provides a virtual identity module serving device, including:

a first receiving module, configured to receive a first recharge request that is sent by user equipment and carries user account information and recharge information;

a first determining module, configured to determine a to-be-recharged virtual identity module and a recharge amount according to the recharge information; and a first sending module, configured to send a second recharge request to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module.

With reference to the third aspect, in a first possible implementation manner of the third aspect, the recharge information includes identity information of the to-be-recharged virtual identity module and recharge amount information; and the first determining module includes:

a first module determining unit, configured to determine the to-be-recharged virtual identity module according to the identity information of the to-be-recharged virtual identity module; and a first amount determining unit, configured to determine the recharge amount according to the recharge amount information.

With reference to the third aspect, in a second possible implementation manner of the third aspect, the recharge information is a recharge recommendation description identifier determined by the user equipment; and the first determining module includes:

an information determining unit, configured to determine recharge recommendation description information according to the recharge recommendation description identifier determined by the user equipment, where the recharge recommendation description information includes identity information of the to-be-recharged virtual identity module and recharge amount information;

a second module determining unit, configured to determine the to-be-recharged virtual identity module according to the identity information of the to-be-recharged virtual identity module; and a second amount determining unit, configured to determine the recharge amount according to the recharge amount information.

With reference to the second possible implementation manner of the third aspect, in a third possible implementation manner of the third aspect, the device further includes:

a second receiving module, configured to: before the first receiving module receives the first recharge request that is sent by the user equipment and carries the user account information and the recharge information, receive location information sent by the user equipment, where the location information is used to indicate a location of the user equipment;

a second determining module, configured to determine, according to the location information, that the to-be-recharged virtual identity module is a virtual identity module that is available at the location of the user equipment or a virtual identity module whose charge is optimal; and a second sending module, configured to: when a fund of the to-be-recharged virtual identity module is insufficient, send the recharge recommendation description identifier and the recharge recommendation description information to the user equipment, so that the user equipment determines the recharge information according to the recharge recommendation description identifier and the recharge recommendation description information.

With reference to the second possible implementation manner of the third aspect, in a fourth possible implementation manner of the third aspect, the device further includes:

a third sending module, configured to: before the receives the first recharge request that is sent by the user equipment and carries the user account information and the recharge information, when it is detected that a first virtual identity module corresponding to the user account has not been in use within a preset time period, and a balance of a second virtual identity module corresponding to the user account is insufficient, send the recharge recommendation description identifier and the recharge recommendation description information to the user equipment, so that the user equipment determines the recharge information according to the recharge recommendation description information and the recharge recommendation description identifier, where the second virtual identity module is the to-be-recharged virtual identity module, and the recharge recommendation description information includes an identifier of the first virtual identity module; and a fourth sending module, configured to: before the first sending module sends the second recharge request to the operations support system of the to-be-recharged virtual identity module, send a fund transfer-out request to an operations support system of the first virtual identity module, where the fund transfer-out request carries the user account information and a transfer-out amount, and the transfer-out amount is equal to the recharge amount, so that the operations support system of the first virtual identity module transfers the transfer-out amount to the account corresponding to the user account information.

With reference to the second possible implementation manner of the third aspect, in a fifth possible implementation manner of the third aspect, the device further includes:

a fifth sending module, configured to: before the first receiving module receives the first recharge request that is sent by the user equipment and carries the user account information and the recharge information, when the to-be-recharged virtual user identity module has a favorable charge rate, and a balance of the to-be-recharged virtual user identity module is lower than a preset amount, send the recharge recommendation description identifier and the recharge recommendation description information to the user equipment, so that the user equipment determines the recharge information according to the recharge recommendation description identifier and the recharge recommendation description information.

With reference to any one of the second to the fifth possible implementation manners of the third aspect, in a sixth possible implementation manner of the third aspect, the device further includes:

a storage module, configured to: after the recharge recommendation description identifier and the recharge recommendation description information are sent to the user equipment, save a relationship between the recharge recommendation description identifier and the recharge recommendation description information; where the information determining unit is configured to:

determine the recharge recommendation description information according to the recharge recommendation description identifier determined by the user equipment, and the relationship between the recharge recommendation description identifier and the recharge recommendation description information.

With reference to the third aspect or any one of the first to the sixth possible implementation manners of the third aspect, in a seventh possible implementation manner of the third aspect, the device further includes: a third receiving module, configured to: after the first sending module sends the second recharge request to the operations support system of the to-be-recharged virtual identity module, receive a response message that is returned by the operations support system of the to-be-recharged virtual identity module after recharging is successful, and record, according to the response message, a balance of the account corresponding to the user account information after recharge and a recharged account balance of the to-be-recharged virtual identity module in the operations support system; and a sixth sending module, configured to send a recharge result to the user equipment, where the recharge result includes an identifier and a balance of the recharged virtual identity module.

According to a fourth aspect, an embodiment of the present disclosure provides user equipment, including:

a determining module, configured to determine recharge information, where the recharge information is used to determine a to-be-recharged virtual identity module and a recharge amount;

a first sending module, configured to send, to a virtual identity module serving device, a first recharge request that carries user account information and the recharge information, so that the virtual identity module serving device sends, to an operations support system of the to-be-recharged virtual identity module, a second recharge request that carries the recharge amount; and a first receiving module, configured to receive a recharge result sent by the virtual identity module serving device.

With reference to the fourth aspect, in a first possible implementation manner of the fourth aspect, the determining module is configured to:

acquire a recharge operation instruction input by a user, and determine the recharge information according to the recharge operation instruction, where the recharge information includes identity information of the to-be-recharged virtual identity module and recharge amount information.

With reference to the fourth aspect, in a second possible implementation manner of the fourth aspect, the recharge information is a recharge recommendation description identifier determined by the user equipment, where the recharge recommendation description identifier is used to identify recharge recommendation description information, and the recharge recommendation description information includes an identifier of the to-be-recharged virtual identity module and recharge amount information.

With reference to the second possible implementation manner of the fourth aspect, in a third possible implementation manner of the fourth aspect, a second sending module is configured to: before the determining module determines the recharge information, detect a geographical location of the user equipment, and when the geographical location of the user equipment changes, send location information to the virtual identity module serving device, where the location information is used to indicate a location of the user equipment, so that the virtual identity module serving device determines, according to the location information, that the to-be-recharged virtual identity module is a virtual identity module that is available at the location of the user equipment or a virtual identity module whose charge is optimal; and the determining module includes:

a first receiving unit, configured to receive the recharge recommendation description identifier and the recharge recommendation description information that are sent by the virtual identity module serving device when a fund of the to-be-recharged virtual identity module is insufficient;

a first presenting unit, configured to present the recharge recommendation description information sent by the virtual identity module serving device;

a second receiving unit, configured to receive a selection input that is made by a user according to the recharge recommendation description information sent by the virtual identity module serving device; and a first processing unit, configured to determine a recharge recommendation description identifier of recharge recommendation description information corresponding to the selection input as the recharge information.

With reference to the second possible implementation manner of the fourth aspect, in a fourth possible implementation manner of the fourth aspect, the determining module includes:

a third receiving unit, configured to receive the recharge recommendation description identifier and the recharge recommendation description information that are sent by the virtual identity module serving device, where the recharge recommendation description information includes an identifier of a first virtual identity module and an identifier of a second virtual identity module that are corresponding to a user account, where the first virtual identity module has not been in use within a preset time period, the to-be-recharged virtual identity module is the second virtual identity module corresponding to the user account, and a balance of the second virtual identity module is insufficient;

a second presenting unit, configured to present the recharge recommendation description information sent by the virtual identity module serving device;

a fourth receiving unit, configured to receive a selection input that is made by a user according to the recharge recommendation description information sent by the virtual identity module serving device; and a second processing unit, configured to determine a recharge recommendation description identifier of recharge recommendation description information corresponding to the selection input as the recharge information.

With reference to the second possible implementation manner of the fourth aspect, in a fifth possible implementation manner of the fourth aspect, the determining module includes:

a fifth receiving unit, configured to receive the recharge recommendation description identifier and the recharge recommendation description information that are sent by the virtual identity module serving device when the to-be-recharged virtual user identity module has a favorable charge rate, and a balance of the to-be-recharged virtual user identity module is lower than a preset amount;

a third presenting unit, configured to present the recharge recommendation description information sent by the virtual identity module serving device;

a sixth receiving unit, configured to receive a selection input that is made by a user according to the recharge recommendation description information sent by the virtual identity module serving device; and a third processing unit, configured to determine a recharge recommendation description identifier of recharge recommendation description information corresponding to the selection input as the recharge information.

According to a fifth aspect, the present disclosure provides a virtual identity module serving device, including:

a receiver, configured to receive a first recharge request that is sent by user equipment and carries user account information and recharge information;

a processor, configured to determine a to-be-recharged virtual identity module and a recharge amount according to the recharge information; and a sender, configured to send a second recharge request to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module.

With reference to the fifth aspect, in a first possible implementation manner of the fifth aspect, the recharge information includes identity information of the to-be-recharged virtual identity module and recharge amount information; and the processor is configured to:

determine the to-be-recharged virtual identity module according to the identity information of the to-be-recharged virtual identity module; and determine the recharge amount according to the recharge amount information.

With reference to the fifth aspect, in a second possible implementation manner of the fifth aspect, the recharge information is a recharge recommendation description identifier determined by the user equipment; and the processor is configured to:

determine recharge recommendation description information according to the recharge recommendation description identifier determined by the user equipment, where the recharge recommendation description information includes identity information of the to-be-recharged virtual identity module and recharge amount information;

determine the to-be-recharged virtual identity module according to the identity information of the to-be-recharged virtual identity module; and determine the recharge amount according to the recharge amount information.

With reference to the second possible implementation manner of the fifth aspect, in a third possible implementation manner of the fifth aspect, the receiver is further configured to: before receiving the first recharge request that is sent by the user equipment and carries the user account information and the recharge information, receive location information sent by the user equipment, where the location information is used to indicate a location of the user equipment;

the processor is further configured to determine, according to the location information, that the to-be-recharged virtual identity module is a virtual identity module that is available at the location of the user equipment or a virtual identity module whose charge is optimal; and the sender is further configured to: when a fund of the to-be-recharged virtual identity module is insufficient, send the recharge recommendation description identifier and the recharge recommendation description information to the user equipment, so that the user equipment determines the recharge information according to the recharge recommendation description identifier and the recharge recommendation description information.

With reference to the second possible implementation manner of the fifth aspect, in a fourth possible implementation manner of the fifth aspect, the sender is further configured to: before the receiver receives the first recharge request that is sent by the user equipment and carries the user account information and the recharge information, when it is detected that a first virtual identity module corresponding to the user account has not been in use within a preset time period, and a balance of a second virtual identity module corresponding to the user account is insufficient, send the recharge recommendation description identifier and the recharge recommendation description information to the user equipment, so that the user equipment determines the recharge information according to the recharge recommendation description information and the recharge recommendation description identifier, where the second virtual identity module is the to-be-recharged virtual identity module, and the recharge recommendation description information includes an identifier of the first virtual identity module; and the sender is further configured to: before sending the second recharge request to the operations support system of the to-be-recharged virtual identity module, send a fund transfer-out request to an operations support system of the first virtual identity module, where the fund transfer-out request carries the user account information and a transfer-out amount, and the transfer-out amount is equal to the recharge amount, so that the operations support system of the first virtual identity module transfers the transfer-out amount to the account corresponding to the user account information.

With reference to the second possible implementation manner of the fifth aspect, in a fifth possible implementation manner of the fifth aspect, the sender is further configured to: before the receiver receives the first recharge request that is sent by the user equipment and carries the user account information and the recharge information, when the to-be-recharged virtual user identity module has a favorable charge rate, and a balance of the to-be-recharged virtual user identity module is lower than a preset amount, send the recharge recommendation description identifier and the recharge recommendation description information to the user equipment, so that the user equipment determines the recharge information according to the recharge recommendation description identifier and the recharge recommendation description information.

With reference to any one of the second to the fifth possible implementation manners of the fifth aspect, in a sixth possible implementation manner of the fifth aspect, the processor is further configured to: after the recharge recommendation description identifier and the recharge recommendation description information are sent to the user equipment, save a relationship between the recharge recommendation description identifier and the recharge recommendation description information; where that the processor determines recharge recommendation description information according to the recharge recommendation description identifier determined by the user equipment is: the processor determines the recharge recommendation description information according to the recharge recommendation description identifier determined by the user equipment, and the relationship between the recharge recommendation description identifier and the recharge recommendation description information.

With reference to the fifth aspect or any one of the first to the sixth possible implementation manners of the fifth aspect, in a seventh possible implementation manner of the fifth aspect, the receiver is further configured to: after the sender sends the second recharge request to the operations support system of the to-be-recharged virtual identity module, receive a response message that is returned by the operations support system of the to-be-recharged virtual identity module after recharging is successful, and record, according to the response message, a balance of the account corresponding to the user account information after recharge and a recharged account balance of the to-be-recharged virtual identity module in the operations support system; and the sender is further configured to send a recharge result to the user equipment, where the recharge result includes an identifier and a balance of the recharged virtual identity module.

According to a sixth aspect, an embodiment of the present disclosure provides user equipment, including:

a processor, configured to determine recharge information, where the recharge information is used to determine a to-be-recharged virtual identity module and a recharge amount;

a sender, configured to send, to a virtual identity module serving device, a first recharge request that carries user account information and the recharge information, so that the virtual identity module serving device sends, to an operations support system of the to-be-recharged virtual identity module, a second recharge request that carries the recharge amount; and a receiver, configured to receive a recharge result that is for the to-be-recharged virtual identity module and sent by the virtual identity module serving device.

With reference to the sixth aspect, in a first possible implementation manner of the sixth aspect, the processor is configured to:

acquire a recharge operation instruction input by a user, and determine the recharge information according to the recharge operation instruction, where the recharge information includes identity information of the to-be-recharged virtual identity module and recharge amount information.

With reference to the sixth aspect, in a second possible implementation manner of the sixth aspect, the recharge information is a recharge recommendation description identifier determined by the user equipment, where the recharge recommendation description identifier is used to identify recharge recommendation description information, and the recharge recommendation description information includes an identifier of the to-be-recharged virtual identity module and recharge amount information.

With reference to the second possible implementation manner of the sixth aspect, in a third possible implementation manner of the sixth aspect, the sender is further configured to: before the processor determines the recharge information, detect a geographical location of the user equipment, and when the geographical location of the user equipment changes, send location information to the virtual identity module serving device, where the location information is used to indicate a location of the user equipment, so that the virtual identity module serving device determines, according to the location information, that the to-be-recharged virtual identity module is a virtual identity module that is available at the location of the user equipment or a virtual identity module whose charge is optimal;

the receiver is further configured to receive the recharge recommendation description identifier and the recharge recommendation description information that are sent by the virtual identity module serving device when a fund of the to-be-recharged virtual identity module is insufficient;

the user equipment further includes:

an output apparatus, configured to present the recharge recommendation description information sent by the virtual identity module serving device; and an input apparatus, configured to receive a selection input that is made by a user according to the recharge recommendation description information sent by the virtual identity module serving device; and the processor is configured to determine a recharge recommendation description identifier of recharge recommendation description information corresponding to the selection input as the recharge information.

With reference to the second possible implementation manner of the sixth aspect, in a fourth possible implementation manner of the sixth aspect, the receiver is further configured to: receive the recharge recommendation description identifier and the recharge recommendation description information that are sent by the virtual identity module serving device, where the recharge recommendation description information includes an identifier of a first virtual identity module and an identifier of a second virtual identity module that are corresponding to a user account, where the first virtual identity module has not been in use within a preset time period, the to-be-recharged virtual identity module is the second virtual identity module corresponding to the user account, and a balance of the second virtual identity module is insufficient;

the user equipment further includes:

an output apparatus, configured to present the recharge recommendation description information sent by the virtual identity module serving device; and an input apparatus, configured to receive a selection input that is made by a user according to the recharge recommendation description information sent by the virtual identity module serving device; and the processor is further configured to determine a recharge recommendation description identifier of recharge recommendation description information corresponding to the selection input as the recharge information.

With reference to the second possible implementation manner of the sixth aspect, in a fifth possible implementation manner of the sixth aspect, the receiver is further configured to: receive the recharge recommendation description identifier and the recharge recommendation description information that are sent by the virtual identity module serving device when the to-be-recharged virtual user identity module has a favorable charge rate, and a balance of the to-be-recharged virtual user identity module is lower than a preset amount;

the user equipment further includes:

an output apparatus, configured to present the recharge recommendation description information sent by the virtual identity module serving device; and an input apparatus, configured to receive a selection input that is made by a user according to the recharge recommendation description information sent by the virtual identity module serving device; and the processor is further configured to determine a recharge recommendation description identifier of recharge recommendation description information corresponding to the selection input as the recharge information.

The embodiments of the present disclosure provide the recharging method for a virtual identity module, and the device. According to the method, a first recharge request that is sent by user equipment and carries user account information and recharge information is received; a to-be-recharged virtual identity module and a recharge amount are determined according to the recharge information; and a second recharge request is sent to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module. The user equipment initiates a recharging process in two possible implementation manners, which diversifies recharging manners, further diversifies recharge information, and therefore brings flexibility and convenience to the recharging process.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
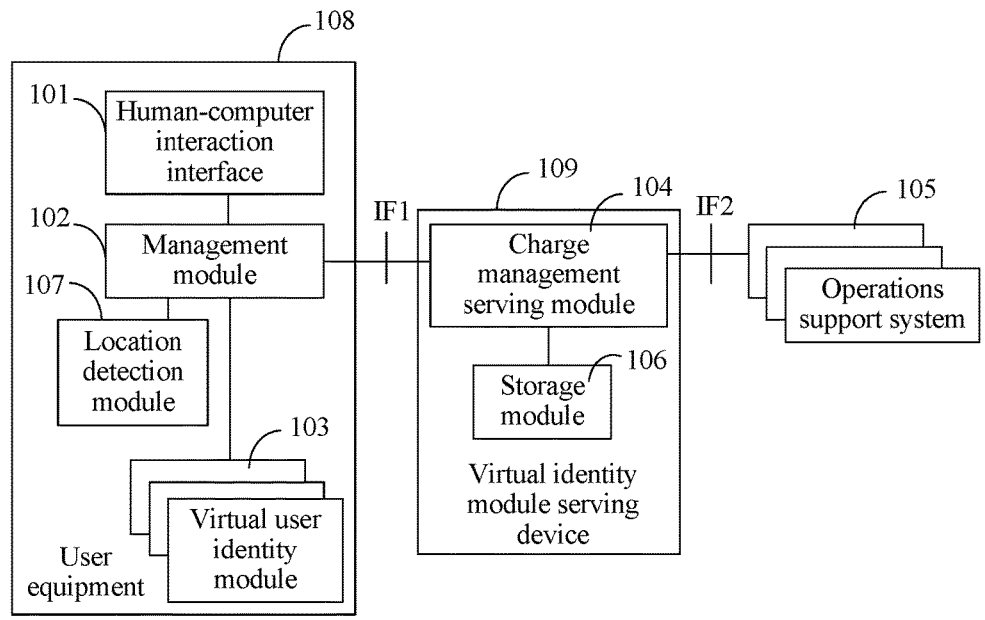
FIG. 1 is a schematic diagram of a structure of a recharging system for a virtual identity module according to the present disclosure.

FIG. 1 is a schematic diagram of a structure of a recharging system for a virtual identity module according to the present disclosure. A recharging method for the virtual identity module of the present disclosure may be implemented by using the recharging system for the virtual identity module provided in an embodiment shown in FIG. 1. As shown in FIG. 1, the recharging system for the virtual identity module includes user equipment 108, a virtual identity module serving device 109, and an operations support system 105.

Multiple virtual identity modules 103 are installed on the user equipment 108, a human-computer interaction interface 101 can be displayed on the user equipment 108, and the human-computer interaction interface 101 can display recharge recommendation description information, a status, including a balance, of each virtual identity module, and the like.

Optionally, the user equipment 108 includes a management module 102 and a location detection module 107. The management module 102 is used by a user to access data of the virtual identity modules and recharge a user account on the virtual identity module serving device 109. There may be multiple recharging methods, for example, cash, third-party payment, and bank transfer. The multiple virtual identity modules may also be downloaded from the virtual identity module serving device 109 by using a fund in the account, and stored on the user equipment. After the management module 102 of the user equipment 108 is started, a virtual identity module list can be displayed. A user of the user equipment 108 may specify, according to the displayed virtual identity module list, a virtual identity module to be currently used, and when a service of an operator is used, a corresponding fee is deducted from the used virtual identity module by the operator. The location detection module 107 may be configured to detect a current geographical location of the user equipment, and send location information to the virtual identity module serving device 109, so that the virtual identity module serving device 109 determines recharge recommendation description information that is available to the user equipment 108. Persons skilled in the art may learn that the management module 102 may be a module that performs management by using a receiver, a sender, and a processor; the location detection module 107 may be a module that performs positioning by using the Global Positioning System (GPS), the Galileo Positioning System, the Global Navigation Satellite System, or the BeiDou Navigation Satellite System (BeiDou (COMPASS) Navigation Satellite System). For hardware structures and operating principles of the management module 102 and the location detection module 107, details are not described herein.

The virtual identity module serving device 109 may be provided by a virtual identity module service provider and include a charge management serving module 104 and a storage module 106. The storage module 106 is configured to store data such as user data, a relationship between a user and a virtual identity module, a charge rate, and a balance. The charge management serving module 104 may set up user account information for the user equipment. A fee source of a corresponding user account may be obtained by means of recharging performed by the user equipment using various channels, and no association is yet established between these charges and the virtual identity modules of the user equipment. Persons skilled in the art may learn that the charge management serving module 104 may be a module that performs management by using a receiver, a sender, and a processor; the storage module 106 may be a module that performs storage by using a memory. For hardware structures and operating principles of the charge management serving module 104 and the storage module 106, details are not described herein. Further, the virtual identity module service provider may purchase virtual identity modules from multiple telecommunications operators, and then provide unified services for a user.

The user account information may be a data structure shown in the following Table 1. When a fee is transferred from an account balance in Table 1 to the virtual identity module for recharging, a balance of the account decreases, and a balance of the virtual identity module increases by a corresponding amount. When the user of the user equipment uses the virtual identity module, the balance of the virtual identity module decreases.

TABLE 1

| User identifier | Account balance (CNY) |
|---|---|
| U001 | 100 |
| U002 | 200 |
| U003 | 500 |

A person skilled in the art may understand that the user account information shown in Table 1 is user account information of multiple users.

The charge management serving module 104 may further set up information about the virtual identity modules of the user equipment. A data structure shown in Table 2 is a relationship table of a user, user equipment, and a virtual identity module. After the user equipment successfully downloads the virtual identity module from a virtual identity module server, the virtual identity module and the virtual identity module serving device establish a mapping relationship between the user, the user equipment, and the virtual identity module.

TABLE 2

| User identifier | User equipment identifier | Identifier of a virtual identity module | Balance (CNY) | Charge rate (CNY/MB) | Operator |
|---|---|---|---|---|---|
| U001 | D001 | C001 | 10 | 0.5 | China Unicom |
|  |  | C002 | 20 | 0.4 | China Telecom |

TABLE 2-continued

2.

| User identifier | User equipment identifier | Identifier of a virtual identity module | Balance (CNY) | Charge rate (CNY/MB) | Operator |
|---|---|---|---|---|---|
| U002 | D002 | C004 | 40 | 1 | Vodafone |
| U002 | D003 | C005 | 5 | 1 | France Telecom |

The charge management serving module 104 may further maintain a geographical location and information about an operator corresponding to an operations support system, so as to select an appropriate operator according to the geographical location, or in other words, to select an appropriate virtual identity module according to the geographical location. Precision of the geographical location may be adjusted according to an actual situation, for example, the geographical location is accurate to a province or a city, or is indicated by using longitude and latitude.

TABLE 3

3.

| Region | Operator |
|---|---|
| China | China Unicom |
| China | China Telecom |
| Britain | Vodafone |
| Spain | France Telecom |

The operations support system 105 of the operator provides a corresponding service for a telecommunications operator to perform recharging, a balance query, and the like for a virtual identity module issued by the telecommunications operator. One virtual identity module serving device 109 may interwork with operations support systems 105 of multiple operators.

An IF1 interface is a charge management interface that is provided by the virtual identity module management serving module 104 for the user equipment, so as to implement functions such as recharging and a balance query.

An IF2 interface is a charge management interface that is provided by the operations support system 105, so as to implement functions such as recharging and a balance query.

Figure 2:
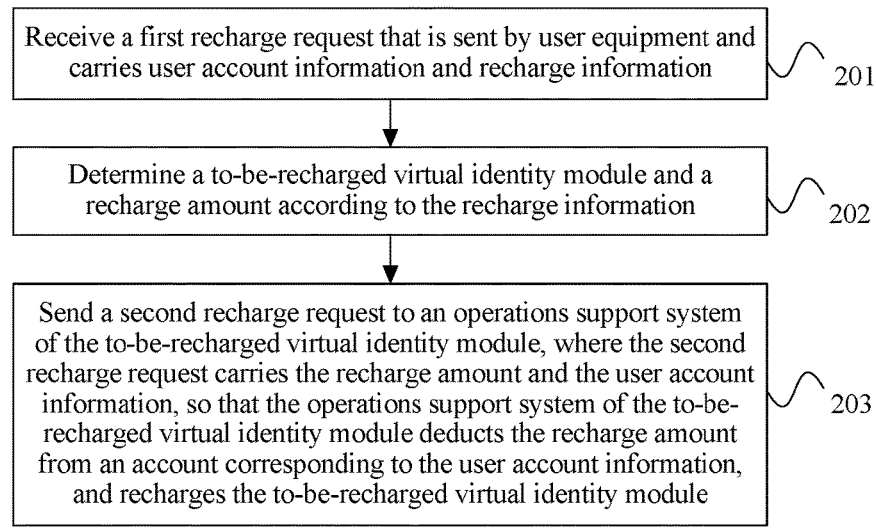
FIG. 2 is a schematic flowchart of Embodiment 1 of a recharging method for a virtual identity module according to the present disclosure.

The following uses a specific embodiment to describe in detail a recharging method for a virtual identity module that is implemented by using the recharging system for the virtual identity module. FIG. 2 is a schematic flowchart of Embodiment 1 of a recharging method for a virtual identity module according to the present disclosure. This embodiment is executed by the virtual identity module serving device in FIG. 1, and the virtual identity module serving device may be implemented by software and/or hardware. The recharging method for a virtual identity module provided in this embodiment includes:

Step 201: Receive a first recharge request that is sent by user equipment and carries user account information and recharge information.

Step 202: Determine a to-be-recharged virtual identity module and a recharge amount according to the recharge information.

Step 203: Send a second recharge request to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module.

In step 201, when the user equipment determines that the used virtual identity module needs to be recharged, the user equipment sends the first recharge request to the virtual identity module serving device; correspondingly, the virtual identity module serving device receives the first recharge request sent by the user equipment, where the first recharge request carries the user account information and the recharge information.

The user account information is information that is set and stored by the virtual identity module serving device for the user equipment and may include a user identifier, an account corresponding to the user identifier, and the like. Before downloading the virtual identity module by using the user equipment, a user may first register an account with the virtual identity module and recharge the account, and then use a fund in the account to purchase and download the virtual identity module by using the virtual identity module serving device. The user may further recharge the virtual identity module subsequently by using the fund in the account. Persons skilled in the art may understand that in a specific implementation process, one account may be corresponding to one virtual identity module, or may be corresponding to multiple virtual identity modules, which is not particularly limited in this embodiment.

Particularly, in a specific implementation process, the user equipment determines that the used virtual identity module needs to be recharged, and the user equipment initiates a recharging process in two possible implementation manners. Persons skilled in the art may understand that the user equipment may determine one virtual identity module, or may determine multiple virtual identity modules, which is not particularly limited in this embodiment.

In one manner, the user triggers the recharging process for the user equipment; the user equipment determines, according to the triggering by the user, that the used virtual identity module needs to be recharged, and then sends, to the virtual identity module serving device, the first recharge request that carries the user account information and the recharge information. Correspondingly, the recharge information includes identity information of the to-be-recharged virtual identity module and recharge amount information.

In the other manner, the virtual identity module serving device first initiates the recharging process to the user equipment; then, the user equipment determines that the used virtual identity module needs to be recharged, and then initiates recharging to the virtual identity module serving device. Correspondingly, the recharge information is a recharge recommendation description identifier. Specifically, the virtual identity module serving device sends the recharge recommendation description identifier and recharge recommendation description information to the user equipment, so that the user equipment determines the recharge information according to the recharge recommendation description identifier and the recharge recommendation description information. After determining the recharge information, the user equipment sends, to the virtual identity module serving device, the first recharge request that carries the user account information and the recharge recommendation description identifier, where the recharge recommendation description identifier is used to identify the recharge recommendation description information. The virtual identity module serving device locally finds corresponding recharge recommendation description information according to the recharge recommendation description identifier, so as to recharge the to-be-recharged virtual identity module according to the recharge recommendation description information.

In step 202, the virtual identity module serving device determines the to-be-recharged virtual identity module and the recharge amount according to the recharge information.

In a specific implementation process, because of different specific implementation manners of the recharge information in step 201, accordingly in step 202, the virtual identity module serving device determines the to-be-recharged virtual identity module and the recharge amount according to the recharge information in different implementation manners.

Specifically, when the recharge information includes the identity information of the to-be-recharged virtual identity module and the recharge amount information, the virtual identity module serving device determines the to-be-recharged virtual identity module according to the identity information of the to-be-recharged virtual identity module, and determines the recharge amount according to the recharge amount information.

When the recharge information is the recharge recommendation description identifier, the virtual identity module serving device determines the recharge recommendation description information according to the recharge recommendation description identifier, where the recharge recommendation description information includes the identity information of the to-be-recharged virtual identity module and the recharge amount information; determines the to-be-recharged virtual identity module according to the identity information of the to-be-recharged virtual identity module; and determines the recharge amount according to the recharge amount information.

In step 203, the virtual identity module serving device sends the second recharge request to the operations support system of the to-be-recharged virtual identity module, where the second recharge request carries the recharge amount and the user account information. After receiving the second recharge request sent by the virtual identity module serving device, the operations support system of the to-be-recharged virtual identity module deducts the recharge amount from the account corresponding to the user account information, and recharges the to-be-recharged virtual identity module.

Optionally, after the operations support system of the to-be-recharged virtual identity module completes recharging for the to-be-recharged virtual identity module, the operations support system of the to-be-recharged virtual identity module returns a response message to the virtual identity module serving device. The virtual identity module serving device receives the response message that is returned by the operations support system of the to-be-recharged virtual identity module after recharging is successful, and records, according to the response message, a balance of the account corresponding to the user account information after recharge and a recharged account balance of the to-be-recharged virtual identity module in the support system. The virtual identity module serving device can generate the recharge recommendation description information for the user equipment by recording the recharged balance of the account corresponding to the user account information and the recharged account balance of the to-be-recharged virtual identity module in the support system. Further, the virtual identity module sends a recharge result to the user equipment, where the recharge result includes an identifier and a balance of the recharged virtual identity module.

According to this embodiment of the present disclosure, a first recharge request that is sent by user equipment and carries user account information and recharge information is received; a to-be-recharged virtual identity module and a recharge amount are determined according to the recharge information; and a second recharge request is sent to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module. The user equipment initiates a recharging process in two possible implementation manners, which diversifies recharging manners, further diversifies recharge information, and therefore brings flexibility and convenience to the recharging process.

Figure 3:
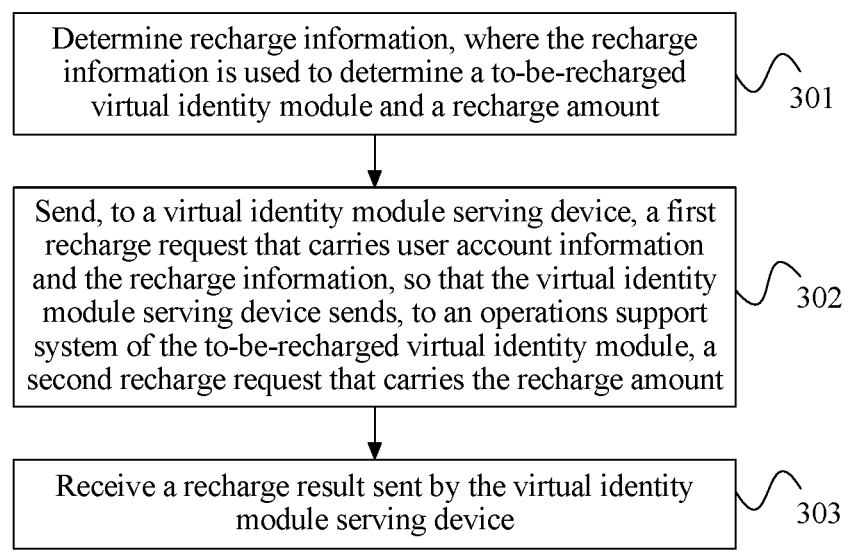
FIG. 3 is a schematic flowchart of Embodiment 2 of a recharging method for a virtual identity module according to the present disclosure.

FIG. 3 is a schematic flowchart of Embodiment 2 of a recharging method for a virtual identity module according to the present disclosure. This embodiment is executed by the user equipment in FIG. 1, and the user equipment may be implemented by software and/or hardware. The recharging method for a virtual identity module provided in this embodiment includes:

Step 301: Determine recharge information, where the recharge information is used to determine a to-be-recharged virtual identity module and a recharge amount.

Step 302: Send, to a virtual identity module serving device, a first recharge request that carries user account information and the recharge information, so that the virtual identity module serving device sends, to an operations support system of the to-be-recharged virtual identity module, a second recharge request that carries the recharge amount.

Step 303: Receive a recharge result sent by the virtual identity module serving device.

For a specific application scenario of this embodiment, reference may be made to the embodiment shown in FIG. 1 and the embodiment shown in FIG. 2, and details are not described again in this embodiment.

It may be learned from the embodiment shown in FIG. 2 that there are two possible implementation manners for the recharge information. Therefore, in step 301, the user equipment determines the recharge information also in two possible implementation manners.

In one possible implementation manner, the user equipment acquires a recharge operation instruction input by a user, and determines the recharge information according to the recharge operation instruction, where the recharge information includes identity information of the to-be-recharged virtual identity module and recharge amount information. In a specific implementation process, when determining to recharge the virtual identity module, the user may input the recharge operation instruction by using the human-computer interaction interface 101 in FIG. 1.

In the other possible implementation manner, the user equipment receives a recharge recommendation description identifier and recharge recommendation description information that are sent by the virtual identity module serving device; the user equipment presents the recharge recommendation description information sent by the virtual identity module serving device, receives a selection input that is made by a user according to the recharge recommendation description information sent by the virtual identity module serving device, and determines a recharge recommendation description identifier of recharge recommendation description information corresponding to the selection input as the recharge information. The recharge recommendation description identifier is used to identify the recharge recommendation description information, and the recharge recommendation description information includes an identifier of the to-be-recharged virtual identity module and recharge amount information.

In step 302, the user equipment sends, to the virtual identity module serving device, the first recharge request that carries the user account information and the recharge information, so that the virtual identity module serving device sends the second recharge request to the operations support system of the to-be-recharged virtual identity module. For a specific implementation process, reference may be made to the embodiment shown in FIG. 2, and details are not described again in this embodiment.

In step 303, the user equipment receives the recharge result sent by the virtual identity module serving device, where the recharge result includes an identifier and a balance of the recharged virtual identity module. The user equipment determines, according to the identifier of the recharged virtual identity module, that the to-be-recharged virtual identity module is recharged, and determines the balance of the virtual identity module.

According to this embodiment of the present disclosure, recharge information is determined; and a first recharge request that carries user account information and the recharge information is sent to a virtual identity module serving device, so that the virtual identity module serving device sends a second recharge request to an operations support system of a to-be-recharged virtual identity module. User equipment determines the recharge information and initiates a recharging process in two possible implementation manners, which diversifies recharging manners, further diversifies recharge information, and therefore brings flexibility and convenience to the recharging process.

The following uses specific embodiments to describe in detail, based on the embodiments in FIG. 1 to FIG. 3, a specific embodiment of the present disclosure in which recharge information is a recharge recommendation description identifier.

Figure 4A:
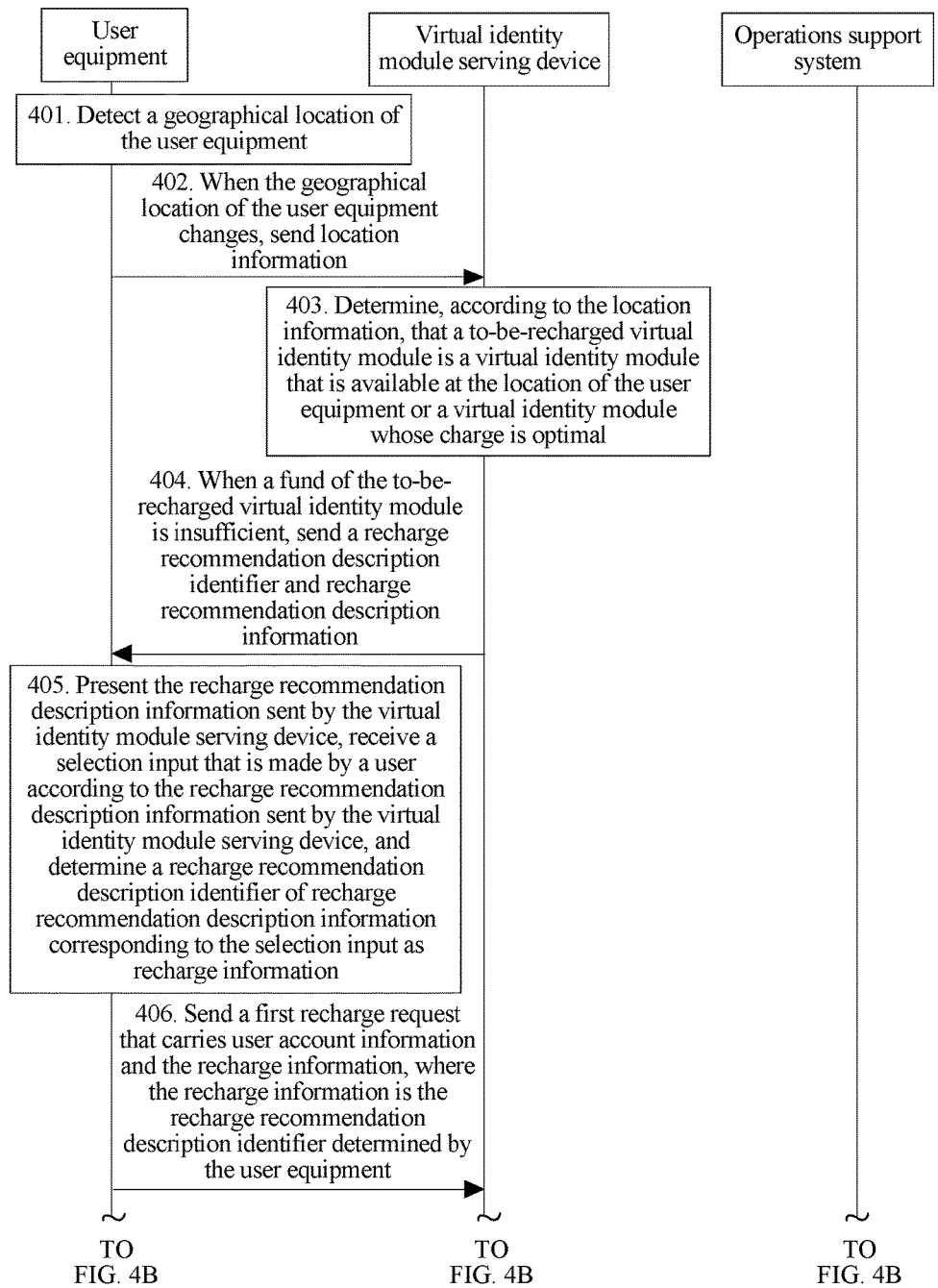
FIG. 4A and FIG. 4B are a signaling flowchart of Embodiment 3 of a recharging method for a virtual identity module according to the present disclosure.
Figure 4B:
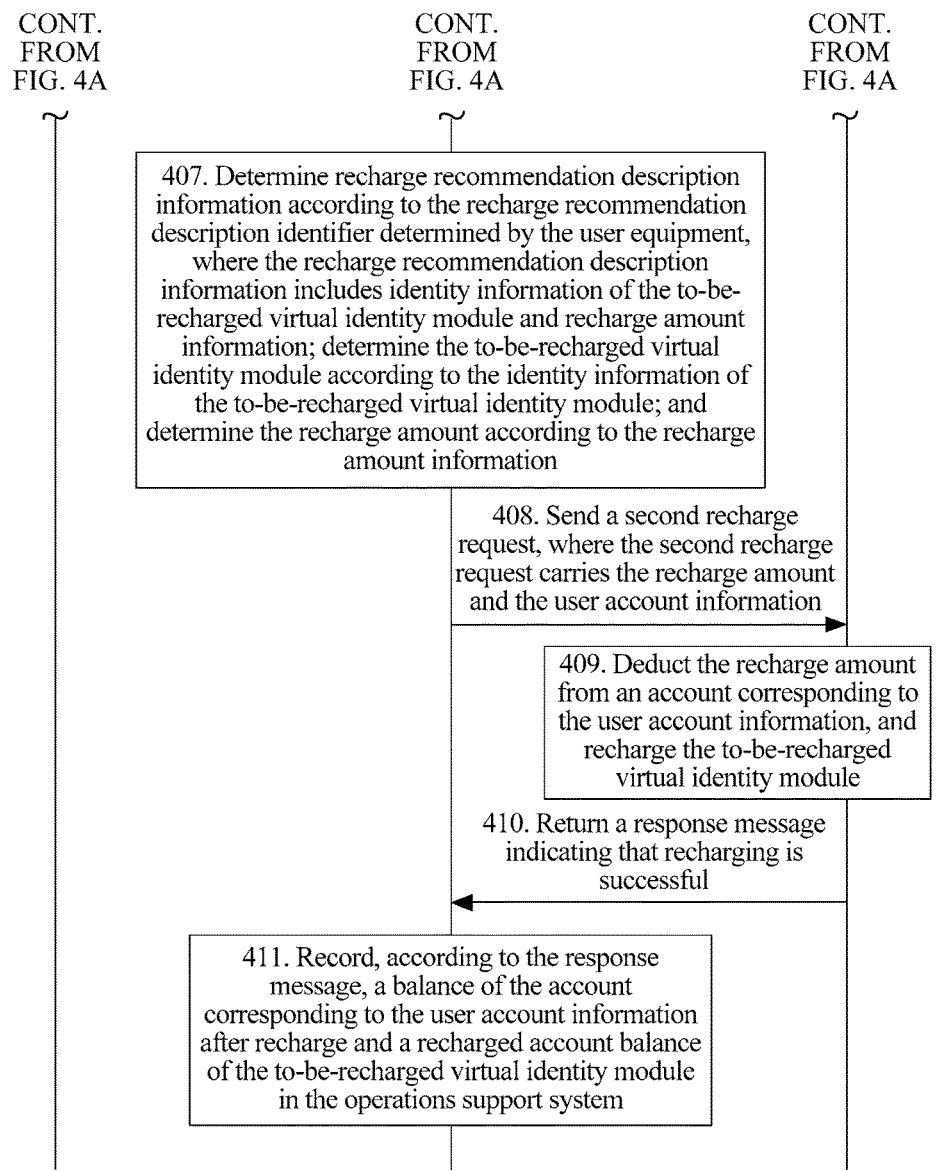

FIG. 4A and FIG. 4B are a signaling flowchart of Embodiment 3 of a recharging method for a virtual identity module according to the present disclosure. As shown in FIG. 4A and FIG. 4B, the recharging method for a virtual identity module provided in this embodiment includes:

401. User equipment detects a geographical location of the user equipment.

402. When the geographical location of the user equipment changes, the user equipment sends location information to a virtual identity module serving device.

The location information is used to indicate a location of the user equipment, so that the virtual identity module serving device determines, according to the location information, that a to-be-recharged virtual identity module is a virtual identity module that is available at the location of the user equipment or a virtual identity module whose charge is optimal.

Correspondingly, the virtual identity module serving device receives the location information sent by the user equipment, where the location information is used to indicate the location of the user equipment.

403. The virtual identity module serving device determines, according to the location information, that a to-be-recharged virtual identity module is a virtual identity module that is available at the location of the user equipment or a virtual identity module whose charge is optimal.

404. The virtual identity module serving device sends a recharge recommendation description identifier and recharge recommendation description information to the user equipment when a fund of the to-be-recharged virtual identity module is insufficient.

Correspondingly, the user equipment receives the recharge recommendation description identifier and the recharge recommendation description information that are sent by the virtual identity module serving device when the fund of the to-be-recharged virtual identity module is insufficient.

Optionally, after step 404, the virtual identity module serving device saves a relationship between the recharge recommendation description identifier and the recharge recommendation description information.

405. The user equipment presents the recharge recommendation description information sent by the virtual identity module serving device, receives a selection input that is made by a user according to the recharge recommendation description information sent by the virtual identity module serving device, and determines a recharge recommendation description identifier of recharge recommendation description information corresponding to the selection input as recharge information.

406. The user equipment sends, to the virtual identity module serving device, a first recharge request that carries user account information and the recharge information, where the recharge information is the recharge recommendation description identifier determined by the user equipment.

407. The virtual identity module serving device determines recharge recommendation description information according to the recharge recommendation description identifier determined by the user equipment, where the recharge recommendation description information includes identity information of the to-be-recharged virtual identity module and recharge amount information; determines the to-be-recharged virtual identity module according to the identity information of the to-be-recharged virtual identity module; and determines a recharge amount according to the recharge amount information.

Specifically, the virtual identity module serving device determines the recharge recommendation description information according to the recharge recommendation description identifier determined by the user equipment, and the relationship between the recharge recommendation description identifier and the recharge recommendation description information.

408. The virtual identity module serving device sends a second recharge request to an operations support system, where the second recharge request carries the recharge amount and the user account information.

409. The operations support system deducts the recharge amount from an account corresponding to the user account information, and recharges the to-be-recharged virtual identity module.

410. The operations support system returns a response message indicating that recharging is successful to the virtual identity module serving device.

411. The virtual identity module serving device records, according to the response message, a balance of the account corresponding to the user account information after recharge and a recharged account balance of the to-be-recharged virtual identity module in the operations support system.

From a perspective of a geographical location in this embodiment, when a user roams from one area to another area, an operations support system that provides a service for the user may change; user equipment triggers a detecting action and sends location information to a virtual identity module serving device; and the virtual identity module serving device determines a virtual identity module that is available at the location or a virtual identity module whose charge is optimal as a to-be-recharged virtual identity module. The foregoing method not only provides convenience and flexibility in recharging for the user, but also reduces a corresponding charge for the user.

Figure 5A:
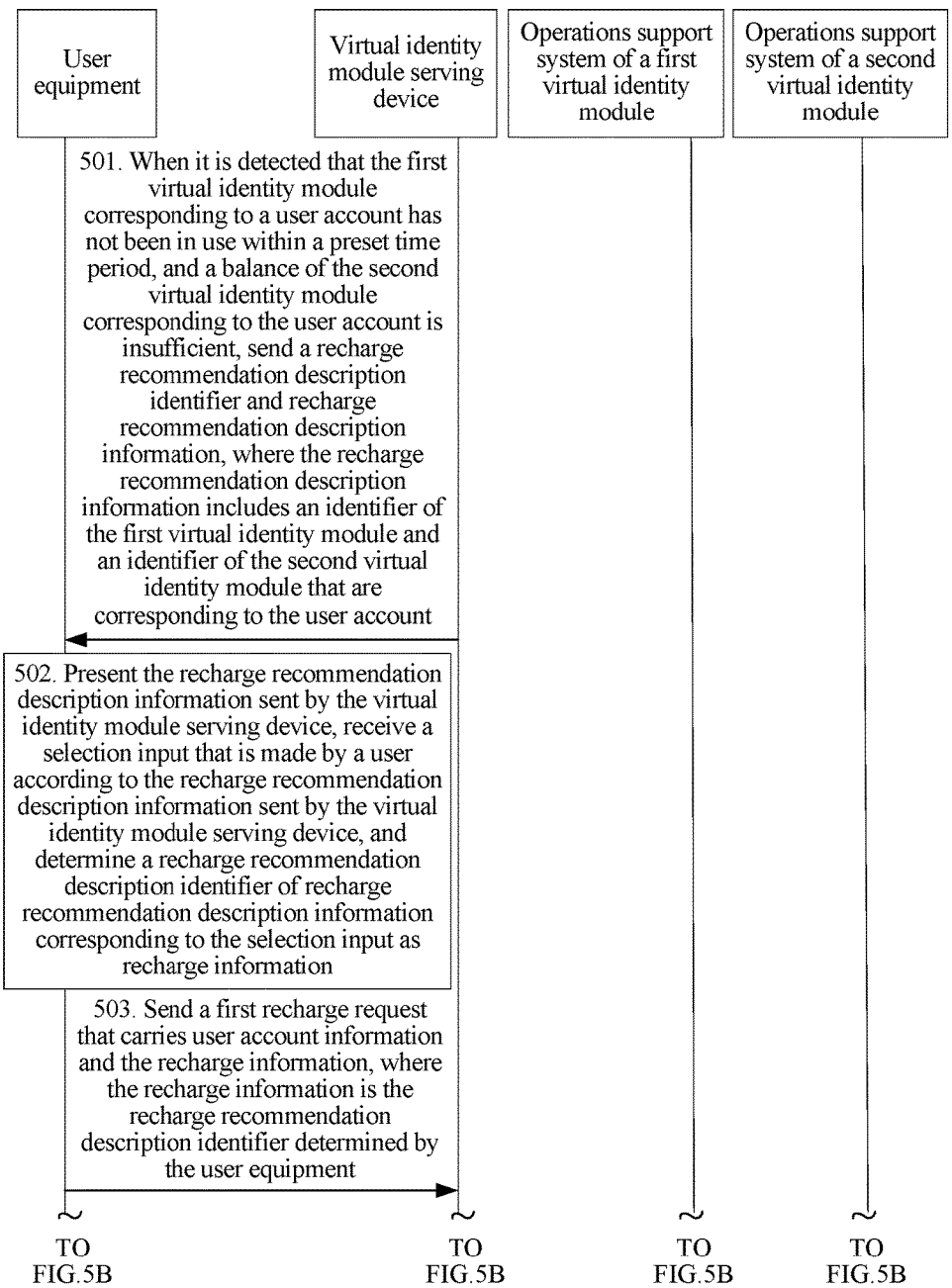
FIG. 5A and FIG. 5B are a signaling flowchart of Embodiment 4 of a recharging method for a virtual identity module according to the present disclosure.
Figure 5B:
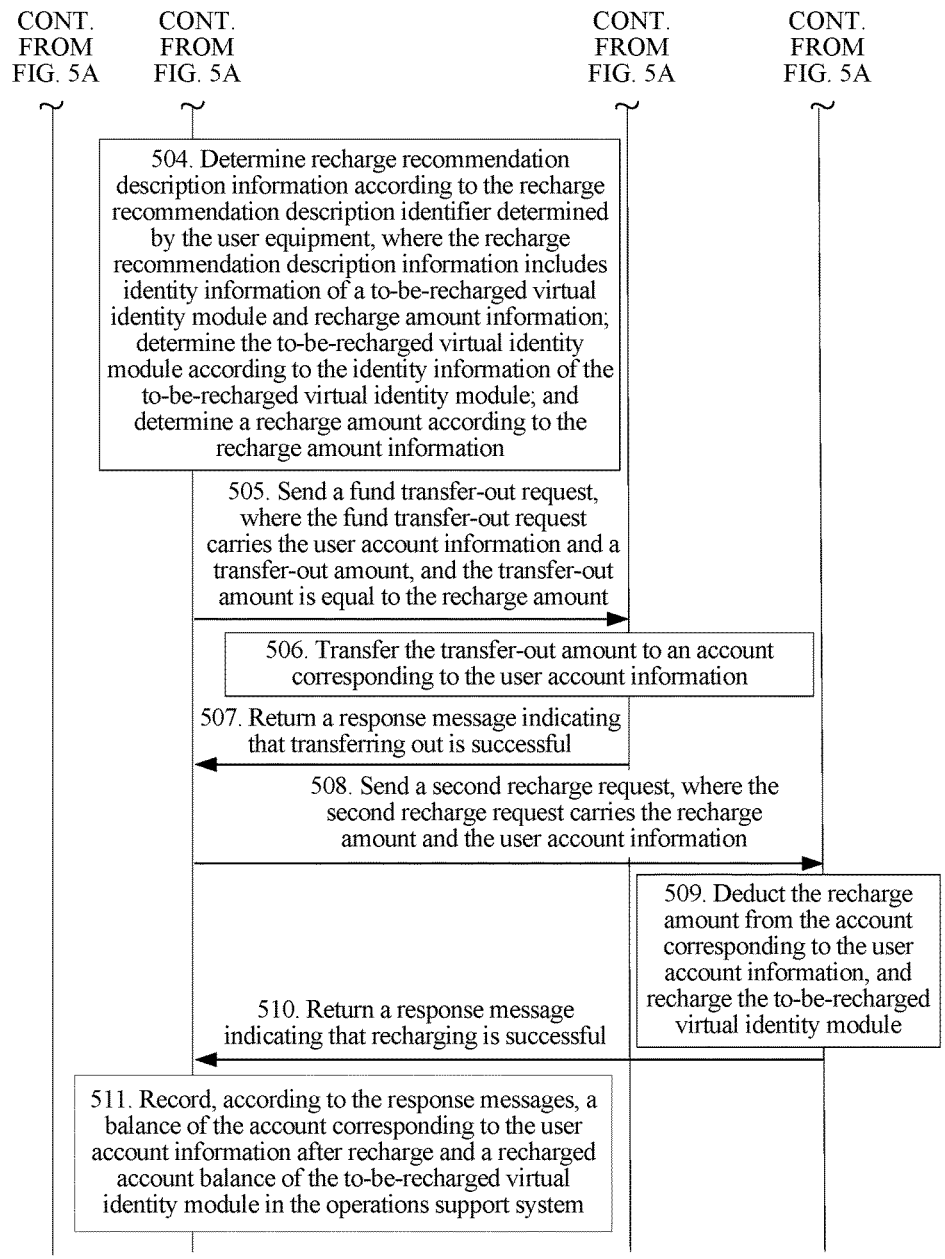

FIG. 5A and FIG. 5B are a signaling flowchart of Embodiment 4 of a recharging method for a virtual identity module according to the present disclosure. As shown in FIG. 5A and FIG. 5B, the recharging method for a virtual identity module provided in this embodiment includes:

501. When a virtual identity module serving device detects that a first virtual identity module corresponding to a user account has not been in use within a preset time period, and a balance of a second virtual identity module corresponding to the user account is insufficient, send a recharge recommendation description identifier and recharge recommendation description information to user equipment, where the recharge recommendation description information includes an identifier of the first virtual identity module and an identifier of the second virtual identity module that are corresponding to the user account.

Correspondingly, the user equipment receives the recharge recommendation description identifier and the recharge recommendation description information that are sent by the virtual identity module serving device, where the recharge recommendation description information includes the identifier of the first virtual identity module and the identifier of the second virtual identity module that are corresponding to the user account, where the first virtual identity module has not been in use within the preset time period, the to-be-recharged virtual identity module is the second virtual identity module corresponding to the user account, and the balance of the second virtual identity module is insufficient.

Optionally, after step 501, the virtual identity module serving device saves a relationship between the recharge recommendation description identifier and the recharge recommendation description information.

502. The user equipment presents the recharge recommendation description information sent by the virtual identity module serving device, receives a selection input that is made by a user according to the recharge recommendation description information sent by the virtual identity module serving device, and determines a recharge recommendation description identifier of recharge recommendation description information corresponding to the selection input as recharge information.

503. The user equipment sends, to the virtual identity module serving device, a first recharge request that carries user account information and the recharge information, where the recharge information is the recharge recommendation description identifier determined by the user equipment.

504. The virtual identity module serving device determines recharge recommendation description information according to the recharge recommendation description identifier determined by the user equipment, where the recharge recommendation description information includes identity information of a to-be-recharged virtual identity module and recharge amount information; determines the to-be-recharged virtual identity module according to the identity information of the to-be-recharged virtual identity module; and determines a recharge amount according to the recharge amount information.

Specifically, the virtual identity module serving device determines the recharge recommendation description information according to the recharge recommendation description identifier determined by the user equipment, and the relationship between the recharge recommendation description identifier and the recharge recommendation description information.

505. The virtual identity module serving device sends a fund transfer-out request to an operations support system of the first virtual identity module, where the fund transfer-out request carries the user account information and a transfer-out amount, and the transfer-out amount is equal to the recharge amount.

506. The operations support system of the first virtual identity module transfers the transfer-out amount to an account corresponding to the user account information.

507. The operations support system of the first virtual identity module returns a response message indicating that transferring out is successful to the virtual identity module serving device.

508. The virtual identity module serving device sends a second recharge request to an operations support system of the second virtual identity module, where the second recharge request carries the recharge amount and the user account information.

509. The operations support system of the second virtual identity module deducts the recharge amount from the account corresponding to the user account information, and recharges the to-be-recharged virtual identity module.

510. The operations support system of the second virtual identity module returns a response message indicating that recharging is successful to the virtual identity module serving device.

511. The virtual identity module serving device records, according to the response messages, a balance of the account corresponding to the user account information after recharge and a recharged account balance of the to-be-recharged virtual identity module in the operations support system.

From a perspective of a time factor in the present disclosure, when a first virtual identity module has not been in use within a preset time period, a virtual identity module serving device determines a second virtual identity module that is corresponding to a user account and whose balance is insufficient, and sends a recharge recommendation description identifier and recharge recommendation description information to user equipment. After a user determines a recharge recommendation description identifier, the user equipment sends a first recharge request to the virtual identity module serving device; then the virtual identity module serving device sends a fund transfer-out request to an operations support system of the first virtual identity module, and after the operations support system of the first virtual identity module successfully transfers a fund, sends a second recharge request to an operations support system of the second virtual identity module, so that the operations support system of the second virtual identity module recharges the second virtual identity module, which implements that one virtual user identity module is recharged by using another virtual user identity module. Recharging manners of a virtual user identity module are more flexible and diversified, thereby improving convenience in recharging the virtual user identity module.

Figure 6A:
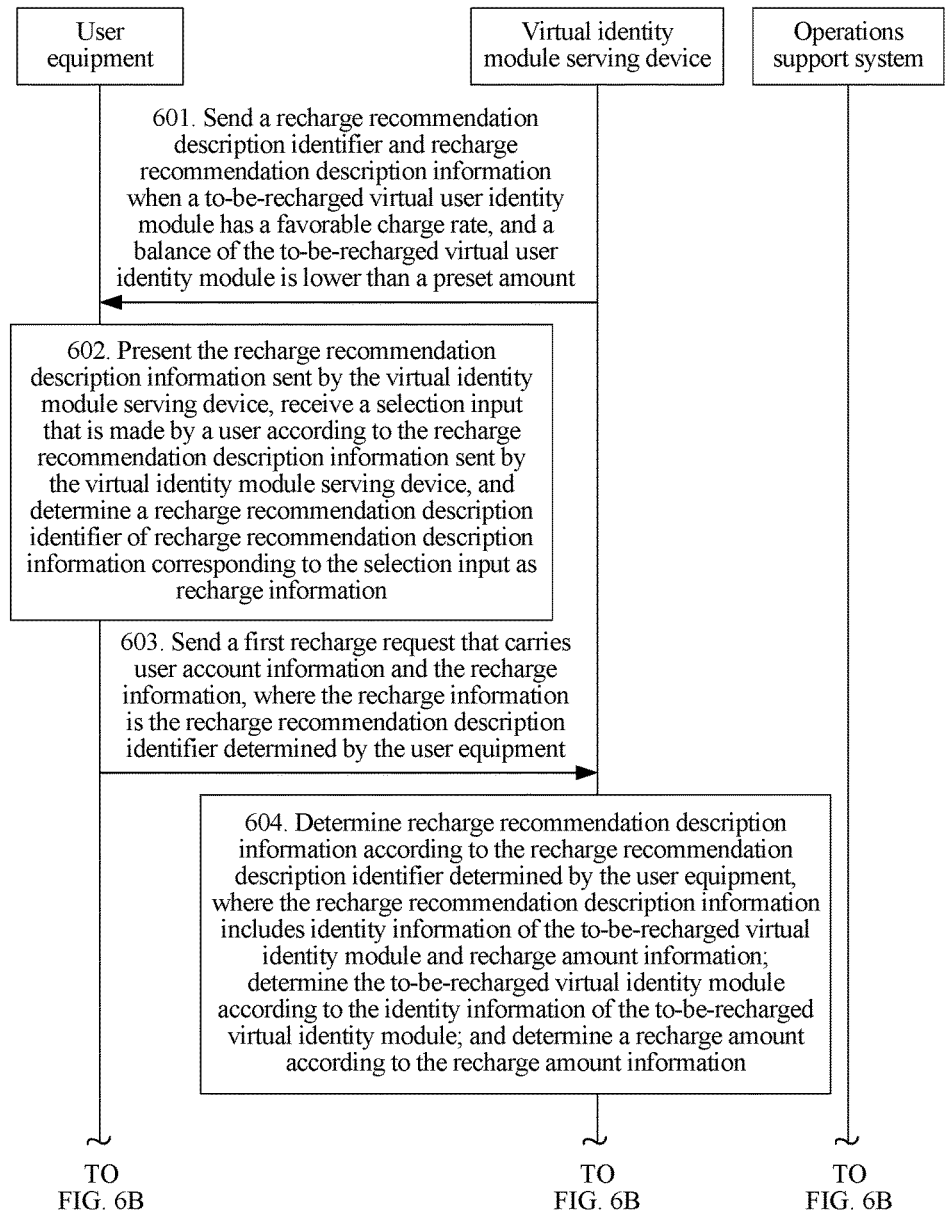
FIG. 6A and FIG. 6B are a signaling flowchart of Embodiment 5 of a recharging method for a virtual identity module according to the present disclosure.
Figure 6B:
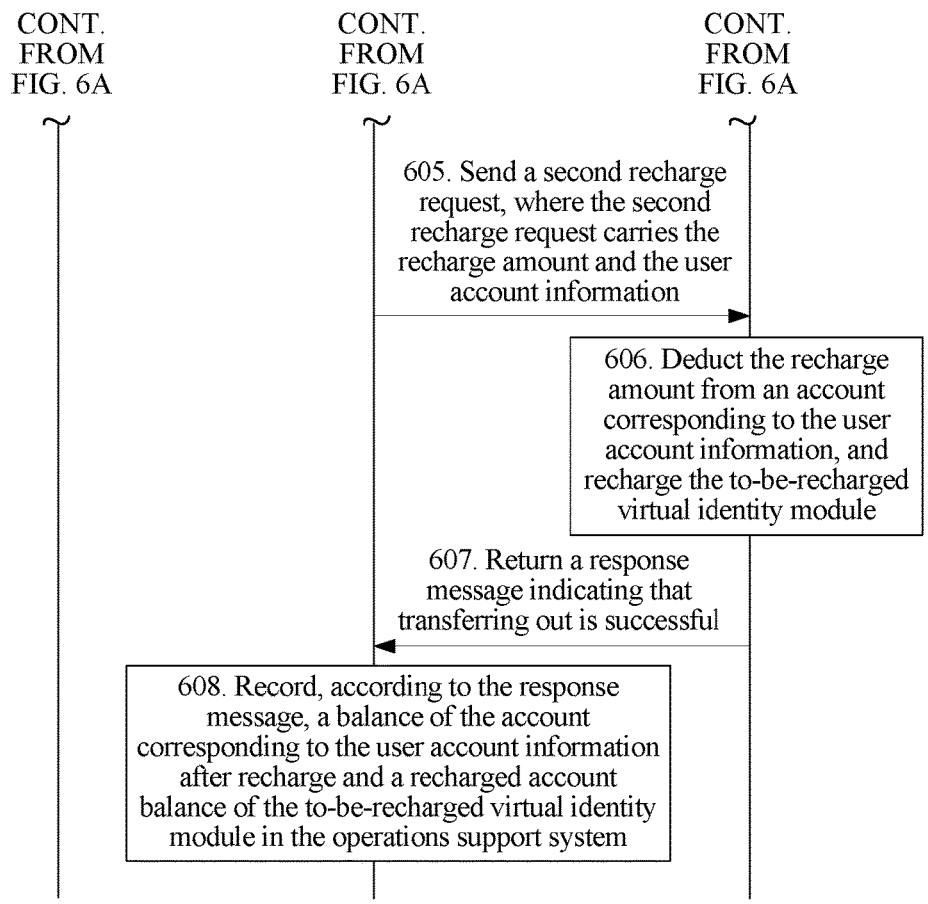

FIG. 6A and FIG. 6B are a signaling flowchart of Embodiment 5 of a recharging method for a virtual identity module according to the present disclosure. As shown in FIG. 6A and FIG. 6B, the recharging method for a virtual identity module provided in this embodiment includes:

601. A virtual identity module serving device sends a recharge recommendation description identifier and a recharge recommendation description information to user equipment when a to-be-recharged virtual user identity module has a favorable charge rate, and a balance of the to-be-recharged virtual user identity module is lower than a preset amount.

Correspondingly, the user equipment receives the recharge recommendation description identifier and the recharge recommendation description information that are sent by the virtual identity module serving device when the to-be-recharged virtual user identity module has the favorable charge rate, and the balance of the to-be-recharged virtual user identity module is lower than the preset amount.

Optionally, after step 601, the virtual identity module serving device saves a relationship between the recharge recommendation description identifier and the recharge recommendation description information.

602. The user equipment presents the recharge recommendation description information sent by the virtual identity module serving device, receives a selection input that is made by a user according to the recharge recommendation description information sent by the virtual identity module serving device, and determines a recharge recommendation description identifier of recharge recommendation description information corresponding to the selection input as recharge information.

603. The user equipment sends, to the virtual identity module serving device, a first recharge request that carries user account information and the recharge information, where the recharge information is the recharge recommendation description identifier determined by the user equipment.

604. The virtual identity module serving device determines recharge recommendation description information according to the recharge recommendation description identifier determined by the user equipment, where the recharge recommendation description information includes identity information of the to-be-recharged virtual identity module and recharge amount information; determines the to-be-recharged virtual identity module according to the identity information of the to-be-recharged virtual identity module; and determines a recharge amount according to the recharge amount information.

Specifically, the virtual identity module serving device determines the recharge recommendation description information according to the recharge recommendation description identifier determined by the user equipment, and the relationship between the recharge recommendation description identifier and the recharge recommendation description information.

605. The virtual identity module serving device sends a second recharge request to an operations support system, where the second recharge request carries the recharge amount and the user account information.

606. The operations support system deducts the recharge amount from an account corresponding to the user account information, and recharges the to-be-recharged virtual identity module.

607. The operations support system returns a response message indicating that transferring out is successful to the virtual identity module serving device.

608. The virtual identity module serving device records, according to the response message, a balance of the account corresponding to the user account information after recharge and a recharged account balance of the to-be-recharged virtual identity module in the operations support system.

From a perspective of a charge rate in this embodiment, when a to-be-recharged virtual user identity module has a favorable charge rate, and a balance of the to-be-recharged virtual user identity module is lower than a preset amount, the to-be-recharged virtual user identity module is recharged, which not only provides convenience and flexibility in recharging for a user, but also reduces a corresponding charge.

Persons skilled in the art may understand that the foregoing embodiments are merely exemplary embodiments, and in a specific implementation process, an application scenario in the embodiments may be applied to any recharging scenario. For example, for traffic, a recharging process is similar to the foregoing embodiments, and a difference lies in that "balance" is replaced with "traffic" in a recharge recommendation. A specific implementation manner of another recharging process to which the embodiments are applied is not particularly limited in the embodiments.

Figure 7:
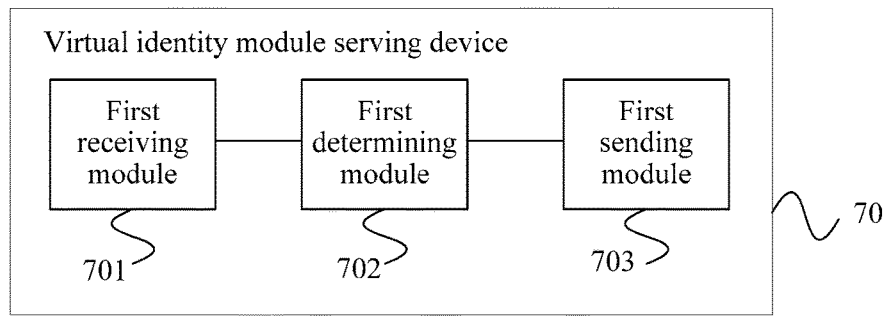
FIG. 7 is a schematic diagram of a structure of Embodiment 1 of a virtual identity module serving device according to the present disclosure.

FIG. 7 is a schematic diagram of a structure of Embodiment 1 of a virtual identity module serving device according to the present disclosure. As shown in FIG. 7, a virtual identity module serving device 70 provided in an embodiment of the present disclosure includes: a first receiving module 701, a first determining module 702, and a first sending module 703.

The first receiving module 701 is configured to receive a first recharge request that is sent by user equipment and carries user account information and recharge information.

The first determining module 702 is configured to determine a to-be-recharged virtual identity module and a recharge amount according to the recharge information.

The first sending module 703 is configured to send a second recharge request to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module.

The virtual identity module serving device provided in this embodiment may be used to execute the technical solutions in the foregoing method embodiments. Implementation principles and technical effects thereof are similar, and details are not described herein again.

Figure 8:
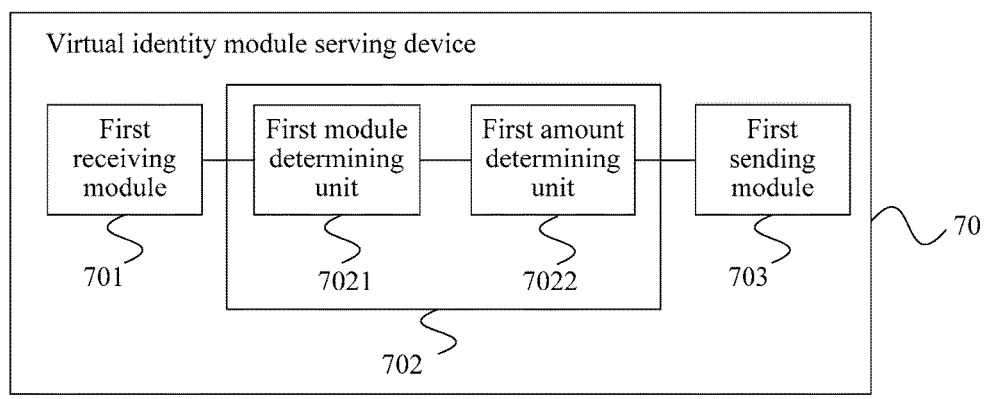
FIG. 8 is a schematic diagram of a structure of Embodiment 2 of a virtual identity module serving device according to the present disclosure.

FIG. 8 is a schematic diagram of a structure of Embodiment 2 of a virtual identity module serving device according to the present disclosure. As shown in FIG. 8, this embodiment is implemented based on the embodiment shown in FIG. 7 and is as follows:

The recharge information includes identity information of the to-be-recharged virtual identity module and recharge amount information.

The first determining module 702 includes:

a first module determining unit 7021, configured to determine the to-be-recharged virtual identity module according to the identity information of the to-be-recharged virtual identity module; and a first amount determining unit 7022, configured to determine the recharge amount according to the recharge amount information.

The virtual identity module serving device provided in this embodiment may be used to execute the technical solutions in the foregoing method embodiments. Implementation principles and technical effects thereof are similar, and details are not described herein again.

Figure 9:
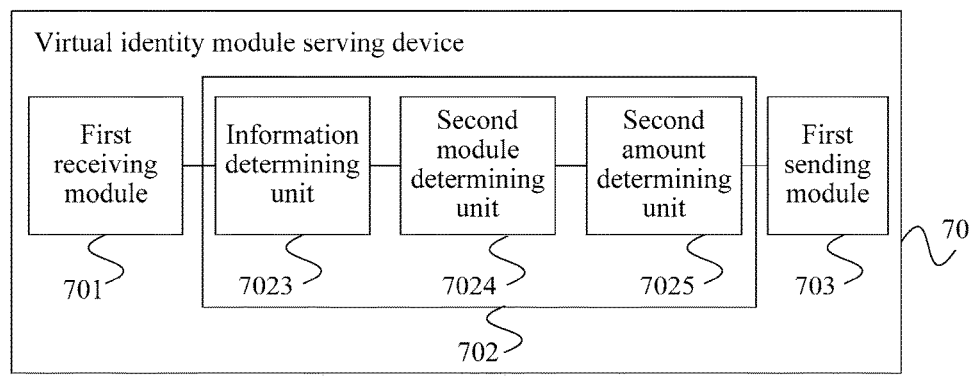
FIG. 9 is a schematic diagram of a structure of Embodiment 3 of a virtual identity module serving device according to the present disclosure.

FIG. 9 is a schematic diagram of a structure of Embodiment 3 of a virtual identity module serving device according to the present disclosure. As shown in FIG. 9, this embodiment is implemented based on the embodiment shown in FIG. 7 and is as follows:

The recharge information is a recharge recommendation description identifier determined by the user equipment.

The first determining module 702 includes:

an information determining unit 7023, configured to determine recharge recommendation description information according to the recharge recommendation description identifier determined by the user equipment, where the recharge recommendation description information includes identity information of the to-be-recharged virtual identity module and recharge amount information;

a second module determining unit 7024, configured to determine the to-be-recharged virtual identity module according to the identity information of the to-be-recharged virtual identity module; and a second amount determining unit 7025, configured to determine the recharge amount according to the recharge amount information.

The virtual identity module serving device provided in this embodiment may be used to execute the technical solutions in the foregoing method embodiments. Implementation principles and technical effects thereof are similar, and details are not described herein again.

Figure 10:
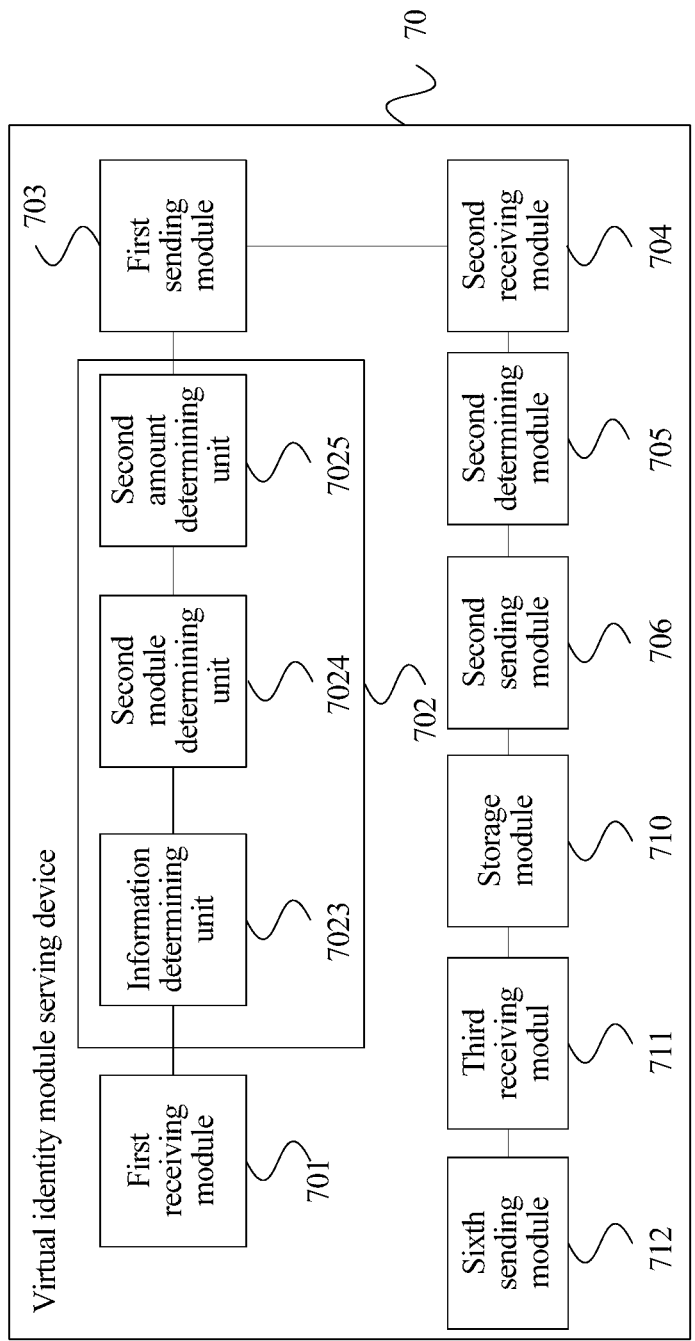
FIG. 10 is a schematic diagram of a structure of Embodiment 4 of a virtual identity module serving device according to the present disclosure.

FIG. 10 is a schematic diagram of a structure of Embodiment 4 of a virtual identity module serving device according to the present disclosure. As shown in FIG. 10, based on the embodiment shown in FIG. 9, this embodiment further includes:

a second receiving module 704, configured to: before the first receiving module receives the first recharge request that is sent by the user equipment and carries the user account information and the recharge information, receive location information sent by the user equipment, where the location information is used to indicate a location of the user equipment;

a second determining module 705, configured to determine, according to the location information, that the to-be-recharged virtual identity module is a virtual identity module that is available at the location of the user equipment or a virtual identity module whose charge is optimal; and a second sending module 706, configured to: when a fund of the to-be-recharged virtual identity module is insufficient, send the recharge recommendation description identifier and the recharge recommendation description information to the user equipment, so that the user equipment determines the recharge information according to the recharge recommendation description identifier and the recharge recommendation description information.

Optionally, the virtual identity module serving device may further include a storage module 710, configured to: after the recharge recommendation description identifier and the recharge recommendation description information are sent to the user equipment, save a relationship between the recharge recommendation description identifier and the recharge recommendation description information; where the information determining unit 7023 is configured to:

determine the recharge recommendation description information according to the recharge recommendation description identifier determined by the user equipment, and the relationship between the recharge recommendation description identifier and the recharge recommendation description information.

Optionally, the virtual identity module serving device further includes: a third receiving module 711, configured to: after the sends the second recharge request to the operations support system of the to-be-recharged virtual identity module, receive a response message that is returned by the operations support system of the to-be-recharged virtual identity module after recharging is successful, and record, according to the response message, a balance of the account corresponding to the user account information after recharge and a recharged account balance of the to-be-recharged virtual identity module in the operations support system; and a sixth sending module 712, configured to send a recharge result to the user equipment, where the recharge result includes an identifier and a balance of the recharged virtual identity module.

The virtual identity module serving device provided in this embodiment may be used to execute the technical solutions in the foregoing method embodiments. Implementation principles and technical effects thereof are similar, and details are not described herein again.

Figure 11:
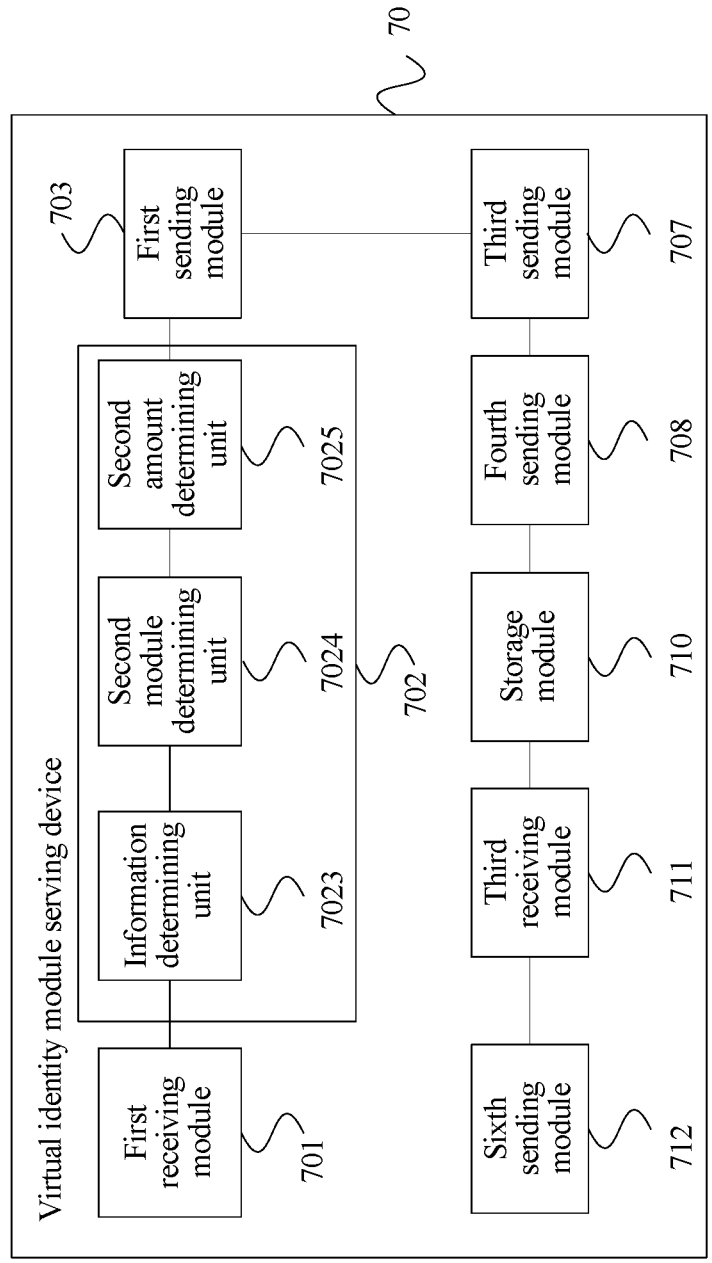
FIG. 11 is a schematic diagram of a structure of Embodiment 5 of a virtual identity module serving device according to the present disclosure.

FIG. 11 is a schematic diagram of a structure of Embodiment 5 of a virtual identity module serving device according to the present disclosure. As shown in FIG. 11, based on the embodiment shown in FIG. 9, this embodiment further includes:

a third sending module 707, configured to: before the first receiving module receives the first recharge request that is sent by the user equipment and carries the user account information and the recharge information, when it is detected that a first virtual identity module corresponding to the user account has not been in use within a preset time period, and a balance of a second virtual identity module corresponding to the user account is insufficient, send the recharge recommendation description identifier and the recharge recommendation description information to the user equipment, so that the user equipment determines the recharge information according to the recharge recommendation description information and the recharge recommendation description identifier, where the second virtual identity module is the to-be-recharged virtual identity module, and the recharge recommendation description information includes an identifier of the first virtual identity module; and a fourth sending module 708, configured to: before the first sending module sends the second recharge request to the operations support system of the to-be-recharged virtual identity module, send a fund transfer-out request to an operations support system of the first virtual identity module, where the fund transfer-out request carries the user account information and a transfer-out amount, and the transfer-out amount is equal to the recharge amount, so that the operations support system of the first virtual identity module transfers the transfer-out amount to the account corresponding to the user account information.

Optionally, the virtual identity module serving device may further include a storage module 710, configured to: after the recharge recommendation description identifier and the recharge recommendation description information are sent to the user equipment, save a relationship between the recharge recommendation description identifier and the recharge recommendation description information; where the information determining unit 7023 is configured to:

determine the recharge recommendation description information according to the recharge recommendation description identifier determined by the user equipment, and the relationship between the recharge recommendation description identifier and the recharge recommendation description information.

Optionally, the virtual identity module serving device further includes: a third receiving module 711, configured to: after the first sending module 703 sends the second recharge request to the operations support system of the to-be-recharged virtual identity module, receive a response message that is returned by the operations support system of the to-be-recharged virtual identity module after recharging is successful, and record, according to the response message, a balance of the account corresponding to the user account information after recharge and a recharged account balance of the to-be-recharged virtual identity module in the operations support system; and a sixth sending module 712, configured to send a recharge result to the user equipment, where the recharge result includes an identifier and a balance of the recharged virtual identity module.

The virtual identity module serving device provided in this embodiment may be used to execute the technical solutions in the foregoing method embodiments. Implementation principles and technical effects thereof are similar, and details are not described herein again.

Figure 12:
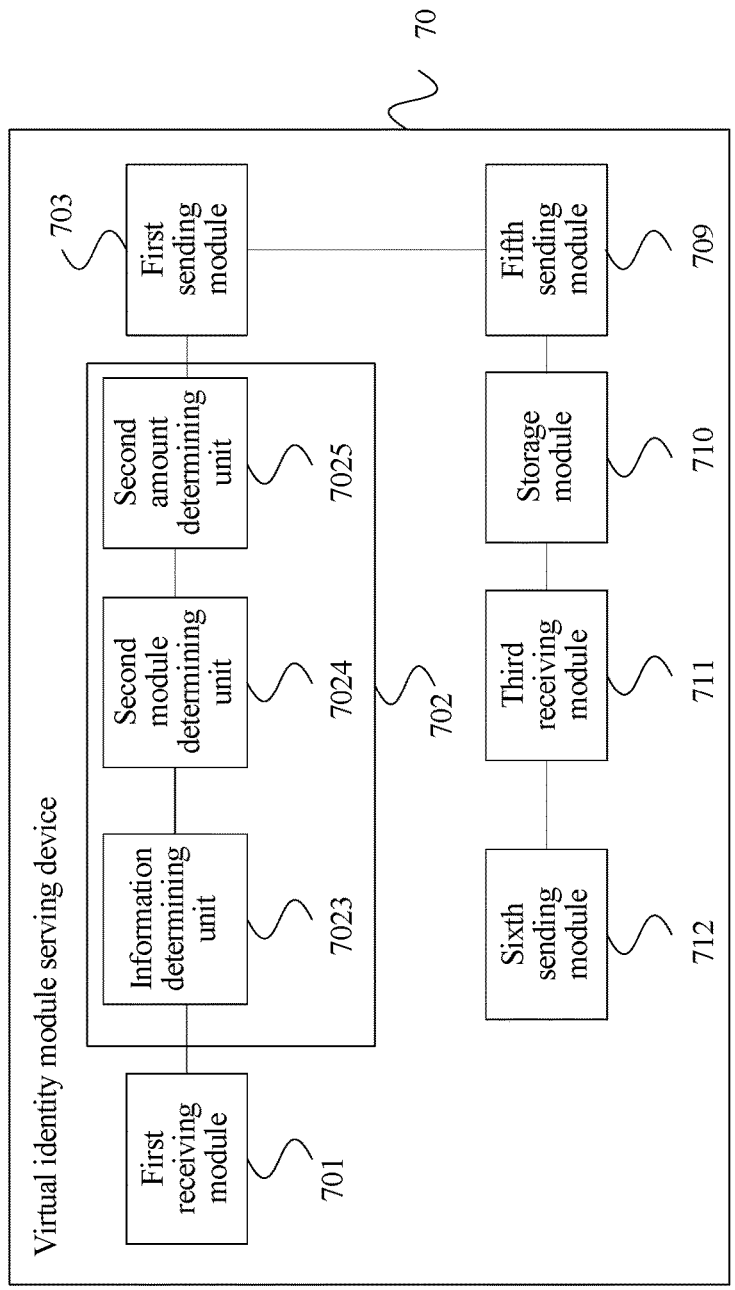
FIG. 12 is a schematic diagram of a structure of Embodiment 6 of a virtual identity module serving device according to the present disclosure.

FIG. 12 is a schematic diagram of a structure of Embodiment 6 of a virtual identity module serving device according to the present disclosure. As shown in FIG. 12, based on the embodiment shown in FIG. 9, this embodiment further includes:

a fifth sending module 709, configured to: before the first receiving module receives the first recharge request that is sent by the user equipment and carries the user account information and the recharge information, when the to-be-recharged virtual user identity module has a favorable charge rate, and a balance of the to-be-recharged virtual user identity module is lower than a preset amount, send the recharge recommendation description identifier and the recharge recommendation description information to the user equipment, so that the user equipment determines the recharge information according to the recharge recommendation description identifier and the recharge recommendation description information.

Optionally, the virtual identity module serving device may further include a storage module 710, configured to: after the recharge recommendation description identifier and the recharge recommendation description information are sent to the user equipment, save a relationship between the recharge recommendation description identifier and the recharge recommendation description information; where the information determining unit 7023 is configured to: determine the recharge recommendation description information according to the recharge recommendation description identifier determined by the user equipment, and the relationship between the recharge recommendation description identifier and the recharge recommendation description information.

Optionally, the virtual identity module serving device further includes: a third receiving module 711, configured to: after the first sending module sends the second recharge request to the operations support system of the to-be-recharged virtual identity module, receive a response message that is returned by the operations support system of the to-be-recharged virtual identity module after recharging is successful, and record, according to the response message, a balance of the account corresponding to the user account information after recharge and a recharged account balance of the to-be-recharged virtual identity module in the operations support system; and a sixth sending module 712, configured to send a recharge result to the user equipment, where the recharge result includes an identifier and a balance of the recharged virtual identity module.

The virtual identity module serving device provided in this embodiment may be used to execute the technical solutions in the foregoing method embodiments. Implementation principles and technical effects thereof are similar, and details are not described herein again.

Figure 13:
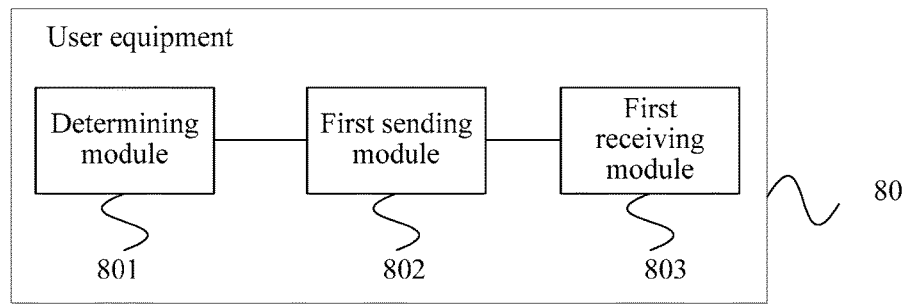
FIG. 13 is a schematic diagram of a structure of Embodiment 1 of user equipment according to the present disclosure.

FIG. 13 is a schematic diagram of a structure of Embodiment 1 of user equipment according to the present disclosure. As shown in FIG. 13, user equipment 80 provided in this embodiment includes a determining module 801, a first sending module 802, and a first receiving module 803.

The determining module 801 is configured to determine recharge information, where the recharge information is used to determine a to-be-recharged virtual identity module and a recharge amount.

The first sending module 802 is configured to send, to a virtual identity module serving device, a first recharge request that carries user account information and the recharge information, so that the virtual identity module serving device sends, to an operations support system of the to-be-recharged virtual identity module, a second recharge request that carries the recharge amount.

The first receiving module 803 is configured to receive a recharge result sent by the virtual identity module serving device.

The user equipment provided in this embodiment may be used to execute the technical solutions in the foregoing method embodiments. Implementation principles and technical effects thereof are similar, and details are not described herein again.

Optionally, the determining module 801 is configured to: acquire a recharge operation instruction input by a user, and determine the recharge information according to the recharge operation instruction, where the recharge information includes identity information of the to-be-recharged virtual identity module and recharge amount information.

Optionally, the recharge information is a recharge recommendation description identifier determined by the user equipment, where the recharge recommendation description identifier is used to identify recharge recommendation description information, and the recharge recommendation description information includes an identifier of the to-be-recharged virtual identity module and recharge amount information.

The user equipment provided in this embodiment may be used to execute the technical solutions in the foregoing method embodiments. Implementation principles and technical effects thereof are similar, and details are not described herein again.

Figure 14:
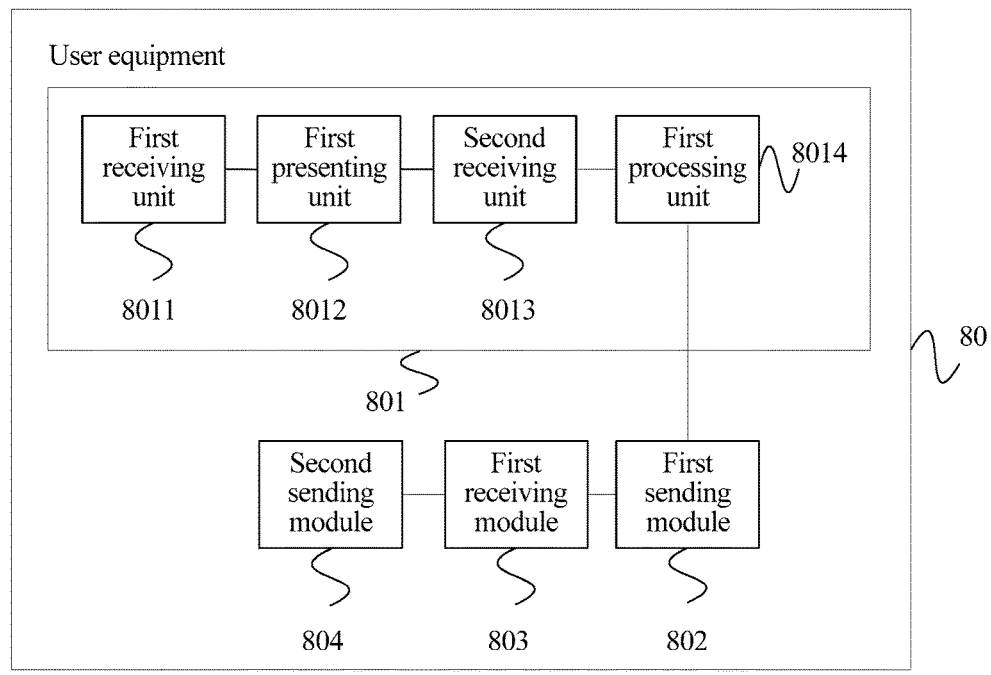
FIG. 14 is a schematic diagram of a structure of Embodiment 2 of user equipment according to the present disclosure.

FIG. 14 is a schematic diagram of a structure of Embodiment 2 of user equipment according to the present disclosure. As shown in FIG. 14, based on the embodiment shown in FIG. 13, this embodiment further includes:

a second sending module 804, configured to: before the determining module determines the recharge information, detect a geographical location of the user equipment, and when the geographical location of the user equipment changes, send location information to the virtual identity module serving device, where the location information is used to indicate a location of the user equipment, so that the virtual identity module serving device determines, according to the location information, that the to-be-recharged virtual identity module is a virtual identity module that is available at the location of the user equipment or a virtual identity module whose charge is optimal; and the determining module 801 includes:

a first receiving unit 8011, configured to receive the recharge recommendation description identifier and the recharge recommendation description information that are sent by the virtual identity module serving device when a fund of the to-be-recharged virtual identity module is insufficient;

a first presenting unit 8012, configured to present the recharge recommendation description information sent by the virtual identity module serving device;

a second receiving unit 8013, configured to receive a selection input that is made by a user according to the recharge recommendation description information sent by the virtual identity module serving device; and a first processing unit 8014, configured to determine a recharge recommendation description identifier of recharge recommendation description information corresponding to the selection input as the recharge information.

The user equipment provided in this embodiment may be used to execute the technical solutions in the foregoing method embodiments. Implementation principles and technical effects thereof are similar, and details are not described herein again.

Figure 15:
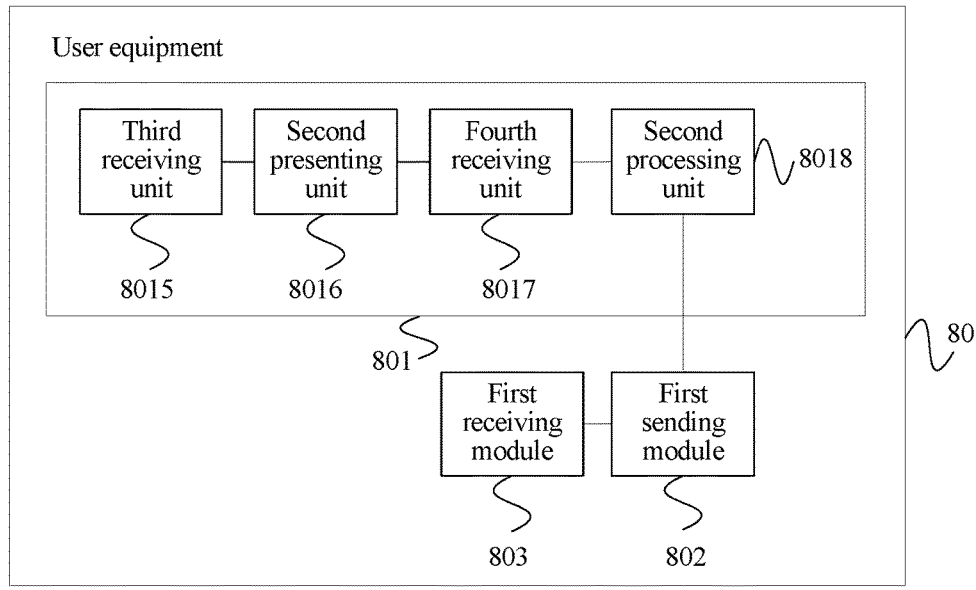
FIG. 15 is a schematic diagram of a structure of Embodiment 3 of user equipment according to the present disclosure.

FIG. 15 is a schematic diagram of a structure Embodiment 3 of user equipment according to the present disclosure. As shown in FIG. 15, this embodiment is implemented based on the embodiment shown in FIG. 13 and is as follows:

The determining module 801 includes:

a third receiving unit 8015, configured to receive the recharge recommendation description identifier and the recharge recommendation description information that are sent by the virtual identity module serving device, where the recharge recommendation description information includes an identifier of a first virtual identity module and an identifier of a second virtual identity module that are corresponding to a user account, where the first virtual identity module has not been in use within a preset time period, the to-be-recharged virtual identity module is the second virtual identity module corresponding to the user account, and a balance of the second virtual identity module is insufficient;

a second presenting unit 8016, configured to present the recharge recommendation description information sent by the virtual identity module serving device;

a fourth receiving unit 8017, configured to receive a selection input that is made by a user according to the recharge recommendation description information sent by the virtual identity module serving device; and a second processing unit 8018, configured to determine a recharge recommendation description identifier of recharge recommendation description information corresponding to the selection input as the recharge information.

The user equipment provided in this embodiment may be used to execute the technical solutions in the foregoing method embodiments. Implementation principles and technical effects thereof are similar, and details are not described herein again.

Figure 16:
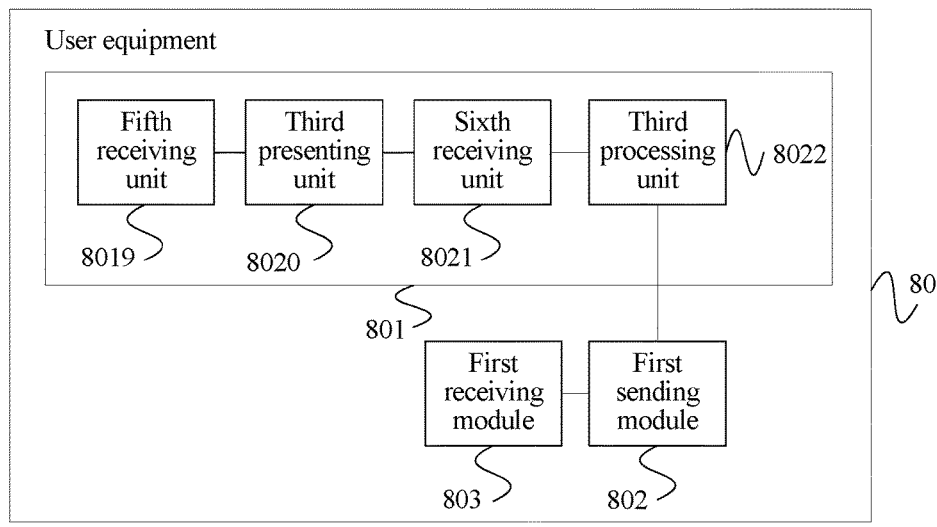
FIG. 16 is a schematic diagram of a structure of Embodiment 4 of user equipment according to the present disclosure.

FIG. 16 is a schematic diagram of a structure of Embodiment 4 of user equipment according to the present disclosure. As shown in FIG. 16, this embodiment is implemented based on the embodiment shown in FIG. 13 and is as follows:

The determining module 801 includes:

a fifth receiving unit 8019, configured to receive the recharge recommendation description identifier and the recharge recommendation description information that are sent by the virtual identity module serving device when the to-be-recharged virtual user identity module has a favorable charge rate, and a balance of the to-be-recharged virtual user identity module is lower than a preset amount;

a third presenting unit 8020, configured to present the recharge recommendation description information sent by the virtual identity module serving device;

a sixth receiving unit 8021, configured to receive a selection input that is made by a user according to the recharge recommendation description information sent by the virtual identity module serving device; and a third processing unit 8022, configured to determine a recharge recommendation description identifier of recharge recommendation description information corresponding to the selection input as the recharge information.

The user equipment provided in this embodiment may be used to execute the technical solutions in the foregoing method embodiments. Implementation principles and technical effects thereof are similar, and details are not described herein again.

Figure 17:
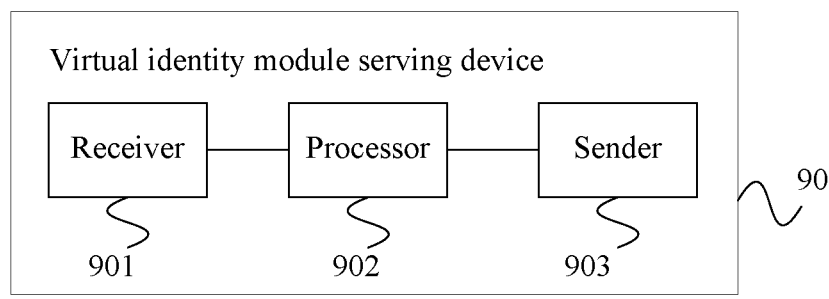
FIG. 17 is a schematic diagram of a structure of Embodiment 7 of a virtual identity module serving device according to the present disclosure.

FIG. 17 is a schematic diagram of a structure of Embodiment 7 of a virtual identity module serving device according to the present disclosure. As shown in FIG. 17, a virtual identity module serving device 90 provided in the present disclosure includes a receiver 901, a processor 902, and a sender 903.

The receiver 901 is configured to receive a first recharge request that is sent by user equipment and carries user account information and recharge information.

The processor 902 is configured to determine a to-be-recharged virtual identity module and a recharge amount according to the recharge information.

The sender 903 is configured to send a second recharge request to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module.

Optionally, the recharge information includes identity information of the to-be-recharged virtual identity module and recharge amount information; and the processor 902 is configured to:

determine the to-be-recharged virtual identity module according to the identity information of the to-be-recharged virtual identity module; and determine the recharge amount according to the recharge amount information.

Optionally, the recharge information is a recharge recommendation description identifier determined by the user equipment; and the processor 902 is configured to:

determine recharge recommendation description information according to the recharge recommendation description identifier determined by the user equipment, where the recharge recommendation description information includes identity information of the to-be-recharged virtual identity module and recharge amount information;

determine the to-be-recharged virtual identity module according to the identity information of the to-be-recharged virtual identity module; and determine the recharge amount according to the recharge amount information.

Optionally, the receiver 901 is further configured to: before receiving the first recharge request that is sent by the user equipment and carries the user account information and the recharge information, receive location information sent by the user equipment, where the location information is used to indicate a location of the user equipment;

the processor 902 is further configured to determine, according to the location information, that the to-be-recharged virtual identity module is a virtual identity module that is available at the location of the user equipment or a virtual identity module whose charge is optimal; and the sender 903 is further configured to: when a fund of the to-be-recharged virtual identity module is insufficient, send the recharge recommendation description identifier and the recharge recommendation description information to the user equipment, so that the user equipment determines the recharge information according to the recharge recommendation description identifier and the recharge recommendation description information.

Optionally, the sender 903 is further configured to: before the receiver receives the first recharge request that is sent by the user equipment and carries the user account information and the recharge information, when it is detected that a first virtual identity module corresponding to the user account has not been in use within a preset time period, and a balance of a second virtual identity module corresponding to the user account is insufficient, send the recharge recommendation description identifier and the recharge recommendation description information to the user equipment, so that the user equipment determines the recharge information according to the recharge recommendation description information and the recharge recommendation description identifier, where the second virtual identity module is the to-be-recharged virtual identity module, and the recharge recommendation description information includes an identifier of the first virtual identity module; and the sender 903 is further configured to: before sending the second recharge request to the operations support system of the to-be-recharged virtual identity module, send a fund transfer-out request to an operations support system of the first virtual identity module, where the fund transfer-out request carries the user account information and a transfer-out amount, and the transfer-out amount is equal to the recharge amount, so that the operations support system of the first virtual identity module transfers the transfer-out amount to the account corresponding to the user account information.

Optionally, the sender 903 is further configured to: before the receiver receives the first recharge request that is sent by the user equipment and carries the user account information and the recharge information, when the to-be-recharged virtual user identity module has a favorable charge rate, and a balance of the to-be-recharged virtual user identity module is lower than a preset amount, send the recharge recommendation description identifier and the recharge recommendation description information to the user equipment, so that the user equipment determines the recharge information according to the recharge recommendation description identifier and the recharge recommendation description information.

Optionally, the processor 902 is further configured to: after the recharge recommendation description identifier and the recharge recommendation description information are sent to the user equipment, save a relationship between the recharge recommendation description identifier and the recharge recommendation description information; where that the processor 902 determines recharge recommendation description information according to the recharge recommendation description identifier determined by the user equipment is: the processor 902 determines the recharge recommendation description information according to the recharge recommendation description identifier determined by the user equipment, and the relationship between the recharge recommendation description identifier and the recharge recommendation description information.

Optionally, the receiver 901 is further configured to: after the sender sends the second recharge request to the operations support system of the to-be-recharged virtual identity module, receive a response message that is returned by the operations support system of the to-be-recharged virtual identity module after recharging is successful, and record, according to the response message, a balance of the account corresponding to the user account information after recharge and a recharged account balance of the to-be-recharged virtual identity module in the operations support system; and the sender 903 is further configured to send a recharge result to the user equipment, where the recharge result includes an identifier and a balance of the recharged virtual identity module.

The virtual identity module serving device provided in this embodiment may be used to execute the technical solutions in the foregoing method embodiments. Implementation principles and technical effects thereof are similar, and details are not described herein again.

Figure 18:
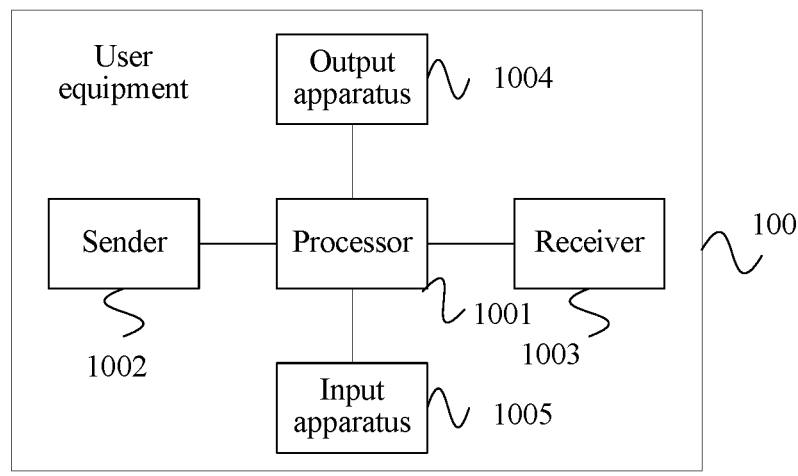
FIG. 18 is a schematic diagram of a structure of Embodiment 5 of user equipment according to the present disclosure.

FIG. 18 is a schematic diagram of a structure of Embodiment 5 of user equipment according to the present disclosure. As shown in FIG. 18, user equipment 100 provided in the present disclosure includes a processor 1001, a sender 1002, and a receiver 1003. Optionally, the user equipment 100 further includes an output apparatus 1004 and an input apparatus 1005.

The processor 1001 is configured to determine recharge information, where the recharge information is used to determine a to-be-recharged virtual identity module and a recharge amount.

The sender 1002 is configured to send, to a virtual identity module serving device, a first recharge request that carries user account information and the recharge information, so that the virtual identity module serving device sends, to an operations support system of the to-be-recharged virtual identity module, a second recharge request that carries the recharge amount.

The receiver 1003 is configured to receive a recharge result sent by the virtual identity module serving device.

Optionally, the processor 1001 is configured to:

acquire a recharge operation instruction input by a user, and determine the recharge information according to the recharge operation instruction, where the recharge information includes identity information of the to-be-recharged virtual identity module and recharge amount information.

Optionally, the recharge information is a recharge recommendation description identifier determined by the user equipment, where the recharge recommendation description identifier is used to identify recharge recommendation description information, and the recharge recommendation description information includes an identifier of the to-be-recharged virtual identity module and recharge amount information.

Optionally, the sender 1002 is further configured to: before the processor determines the recharge information, detect a geographical location of the user equipment, and when the geographical location of the user equipment changes, send location information to the virtual identity module serving device, where the location information is used to indicate a location of the user equipment, so that the virtual identity module serving device determines, according to the location information, that the to-be-recharged virtual identity module is a virtual identity module that is available at the location of the user equipment or a virtual identity module whose charge is optimal;

the receiver 1003 is further configured to receive the recharge recommendation description identifier and the recharge recommendation description information that are sent by the virtual identity module serving device when a fund of the to-be-recharged virtual identity module is insufficient;

the user equipment further includes:

the output apparatus 1004, configured to present the recharge recommendation description information sent by the virtual identity module serving device; and the input apparatus 1005, configured to receive a selection input that is made by a user according to the recharge recommendation description information sent by the virtual identity module serving device; and the processor 1001 is configured to determine a recharge recommendation description identifier of recharge recommendation description information corresponding to the selection input as the recharge information.

Optionally, the receiver 1003 is further configured to: receive the recharge recommendation description identifier and the recharge recommendation description information that are sent by the virtual identity module serving device, where the recharge recommendation description information includes an identifier of a first virtual identity module and an identifier of a second virtual identity module that are corresponding to a user account, where the first virtual identity module has not been in use within a preset time period, the to-be-recharged virtual identity module is the second virtual identity module corresponding to the user account, and a balance of the second virtual identity module is insufficient;

the user equipment further includes:

the output apparatus 1004, configured to present the recharge recommendation description information sent by the virtual identity module serving device; and the input apparatus 1005, configured to receive a selection input that is made by a user according to the recharge recommendation description information sent by the virtual identity module serving device; and the processor 1001 is further configured to determine a recharge recommendation description identifier of recharge recommendation description information corresponding to the selection input as the recharge information.

Optionally, the receiver 1003 is further configured to: receive the recharge recommendation description identifier and the recharge recommendation description information that are sent by the virtual identity module serving device when the to-be-recharged virtual user identity module has a favorable charge rate, and a balance of the to-be-recharged virtual user identity module is lower than a preset amount;

the user equipment further includes:

the output apparatus 1004, configured to present the recharge recommendation description information sent by the virtual identity module serving device; and the input apparatus 1005, configured to receive a selection input that is made by a user according to the recharge recommendation description information sent by the virtual identity module serving device; and the processor 1001 is further configured to determine a recharge recommendation description identifier of recharge recommendation description information corresponding to the selection input as the recharge information.

In the foregoing embodiments, the input apparatus 1004 is configured to implement interaction between the user and the user equipment and/or input information to the user equipment. For example, the input apparatus may receive number or character information that is input by the user, so as to generate a signal input related to user settings or function control. In a specific implementation manner of the present disclosure, the input apparatus may be a touch panel, may be another human-computer interaction interface, for example, a physical input key and a microphone, or may be another apparatus for acquiring external information, for example, a camera. The touch panel, which is also referred to as a touchscreen, may collect an operation action performed by the user by touching the touch panel or near the touch panel, for example, an operation action performed by the user on the touch panel or at a location close to the touch panel by using any appropriate object or appendage such as a finger or a stylus, and a corresponding connecting apparatus is driven according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller; the touch controller receives the electrical signal from the touch detection apparatus, converts the electrical signal into touch point coordinates, and then transmits the touch point coordinates to a processing unit. The touch controller may further receive and execute a command sent from the processing unit. In addition, the touch panel may be implemented in multiple types, such as a resistive type, a capacitive type, an infrared (Infrared) ray, and a surface acoustic wave. In another implementation manner of the present disclosure, the physical input key used by the input apparatus may include but is not limited to one or more of a physical keyboard, a function key (such as a volume control key or an on/off key), a trackball, a mouse, a joystick, and the like. The input apparatus in a form of a microphone may capture voice that is input by the user or in an environment, and convert the voice into a command that is in an electrical signal form and may be executed by the processing unit.

The output apparatus 1005 includes but is not limited to an image output apparatus and a voice output apparatus. The image output apparatus is configured to output a character, a picture, and/or a video. The image output apparatus may include a display panel, for example, a display panel configured in a form of an LCD (Liquid Crystal Display), an OLED (Organic Light-Emitting Diode), a field emission display (FED for short), and the like; or the image output apparatus may include a reflective display, for example, an electrophoretic display, or a display using an interferometric modulation of light technology. The image output apparatus may include a single display or multiple displays in different sizes. In a specific implementation manner of the present disclosure, the touch panel used by the foregoing input unit may also be used as the display panel of the output apparatus at the same time. For example, after detecting a gesture operation by touching the touch panel or near the touch panel, the touch panel transmits the gesture operation to the processing unit, so as to determine a type of a touch event, and then the processing unit provides a corresponding visual output on the display panel according to the type of the touch event. In FIG. 1, the input unit and the output apparatus serve as two independent parts to implement input and output functions of the user equipment; however, in some embodiments, the touch panel and the display panel may be integrated to implement the input and output functions of the user equipment. For example, the image output apparatus may display various graphical user interfaces (Graphical User Interface, GUI for short), so as to use the graphical user interfaces as virtual control components, and the graphical user interfaces include but are not limited to a window, a scroll bar, an icon, and a clipboard, so that a user operates in a touch manner.

In a specific implementation manner of the present disclosure, the image output apparatus includes a filter and an amplifier and is configured to filter and amplify a video that is output by the processing unit. An audio output apparatus includes a digital analog converter, configured to convert an audio signal that is output by the processing unit from a digital format to an analog format.

The sender 1002 and the receiver 1003 are configured to establish a communication channel. The sender 1002 and the receiver 1003 may include communications modules, such as a wireless local area network (wireless LAN for short) module, a Bluetooth module, a baseband module, and radio frequency (RF for short) circuits corresponding to the communications modules, so as to perform wireless local area network communication, Bluetooth communication, infrared communication and/or cellular communications system communication, for example, Wideband Code Division Multiple Access (W-CDMA for short) and/or High Speed Downlink Packet Access (HSDPA for short). The sender 1002 and the receiver 1003 are configured to control communication of various components of the user equipment, and can support direct memory access.

In different implementation manners of the present disclosure, various communications modules of the sender 1002 and the receiver 1003 generally appear in a form of an integrated circuit chip, and may be combined selectively without a need to include all the communications modules and corresponding antenna groups. For example, the sender 1002 and the receiver 1003 may include only a baseband chip, a radio frequency chip, and a corresponding antenna, so as to provide a communication function in one cellular communications system. The user equipment can connect to a cellular network or the Internet via a wireless communications connection established by the sender 1002 and the receiver 1003, for example, by using wireless local area network access or WCDMA access of the receiver 1003. In some optional implementation manners of the present disclosure, a communications module, for example, the baseband module, of the sender 1002 and the receiver 1003 may be integrated into a processor unit, typically, such as an APQ+MDM platform provided by the Qualcomm company.

The radio frequency circuit is used for information receiving and sending or signal receiving and sending during a call process. For example, after receiving downlink information of a base station, the radio frequency circuit sends the downlink information to the processing unit for processing; and in addition, sends uplink data of a mobile phone to the base station. Generally, the radio frequency circuit includes a commonly known circuit that is configured to perform these functions, includes but is not limited to an antenna system, a radio frequency transceiver, one or more amplifiers, a tuner, one or more oscillators, a digital signal processor, a codec chip set, a subscriber identity module (SIM) card, a memory, and the like. In addition, the radio frequency circuit may further communicate with a network and another device by using wireless communications. The wireless communications may use any communications standard or protocol, including but not limited to GSM (Global System for Mobile Communications), GPRS (general packet radio service), CDMA (Code Division Multiple Access), WCDMA (Wideband Code Division Multiple Access), a High Speed Uplink Packet Access (HSUPA) technology, LTE (Long Term Evolution, Long Term Evolution), an email, an SMS (Short Messaging Service, Short Message Service), and the like.

The user equipment provided in this embodiment may be used to execute the technical solutions in the foregoing method embodiments. Implementation principles and technical effects thereof are similar, and details are not described herein again.

With descriptions of the foregoing embodiments, persons skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and disc (disc) used by the present disclosure includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

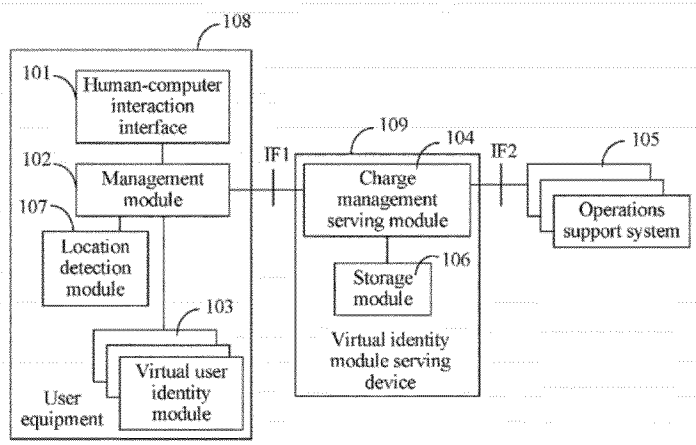

What is claimed is:

1. A recharging method for a virtual identity module, the method comprising:
 receiving location information sent by user equipment, wherein the location information indicates a location of the user equipment;

determining, according to the location information, that a to-be-recharged virtual identity module is available at the location of the user equipment;

sending a recharge recommendation description identifier and a recharge recommendation description information to the user equipment when a fund of the to-be-recharged virtual identity module is insufficient;

receiving a first recharge request sent by the user equipment that carries user account information and recharge information associated with the user equipment;

determining a recharge amount according to the recharge information; and sending a second recharge request to an operations support system of the to-be-recharged virtual identity module, wherein the second recharge request carries the recharge amount and the user account information, which enables the operations support system of the to-be-recharged virtual identity module to deduct the recharge amount from an account associated with the user account information, and recharge the to-be-recharged virtual identity module.

2. The method according to claim 1, wherein the recharge information comprises identity information of the to-be-recharged virtual identity module and recharge amount information; and wherein determining the to-be-recharged virtual identity module and the recharge amount according to the recharge information comprises:

determining the to-be-recharged virtual identity module according to the identity information of the to-be-recharged virtual identity module; and determining the recharge amount according to the recharge amount information.

3. The method according to claim 1, wherein before receiving the first recharge request, the method further comprises:

when it is detected that (a) a first virtual identity module corresponding to the user account has not been in use within a preset time period, and (b) a balance of a second virtual identity module corresponding to the user account is insufficient, sending the recharge recommendation description identifier and the recharge recommendation description information to the user equipment, so that the user equipment determines the recharge information according to the recharge recommendation description identifier and the recharge recommendation description information, wherein the second virtual identity module is the to-be-recharged virtual identity module, and the recharge recommendation description information comprises an identifier of the first virtual identity module; and before sending the second recharge request to the operations support system of the to-be-recharged virtual identity module, the method further comprises:

sending a fund transfer-out request to an operations support system of the first virtual identity module, wherein the fund transfer-out request carries the user account information and a transfer-out amount, and the transfer-out amount is equal to the recharge amount, so that the operations support system of the first virtual identity module transfers the transfer-out amount to the account corresponding to the user account information.

4. The method according to claim 1, wherein before receiving the first recharge request, the method further comprises:

when the to-be-recharged virtual user identity module has a favorable charge rate, and a balance of the to-be-recharged virtual user identity module is lower than a preset amount, sending the recharge recommendation description identifier and the recharge recommendation description information to the user equipment, so that the user equipment determines the recharge information according to the recharge recommendation description identifier and the recharge recommendation description information.

5. The method according to claim 1, wherein after sending the recharge recommendation description identifier and the recharge recommendation description information to the user equipment, the method further comprises:

saving a relationship between the recharge recommendation description identifier and the recharge recommendation description information; and wherein determining the recharge recommendation description information according to the recharge recommendation description identifier determined by the user equipment comprises:

determining the recharge recommendation description information according to the recharge recommendation description identifier determined by the user equipment, and the relationship between the recharge recommendation description identifier and the recharge recommendation description information.

6. The method according to claim 1, wherein after sending the second recharge request to the operations support system of the to-be-recharged virtual identity module, the method further comprises:

receiving a response message that is returned by the operations support system of the to-be-recharged virtual identity module after recharging is successful;

recording, according to the response message, a balance of the account corresponding to the user account information after recharge and a recharged account balance of the to-be-recharged virtual identity module in the operations support system; and sending a recharge result to the user equipment, wherein the recharge result comprises an identifier and a balance of the recharged virtual identity module.

7. A virtual identity module serving device comprising:

a receiver configured to (a) receive location information sent by user equipment, wherein the location information indicates a location of the user equipment, and (b) thereafter receive a first recharge request sent by the user equipment and that carries user account information and recharge information associated with the user equipment;

a processor configured to:

a) determine, according to the recharge information, a to-be-recharged virtual identity module and a recharge amount, b) determine, according to the location information, that the to-be-recharged virtual identity module is available at the location of the user equipment, c) determine, according to the recharge information, identity information of the to-be-recharged virtual identity module and recharge amount information, d) determine the to-be-recharged virtual identity module according to the identity information of the to-be-recharged virtual identity module, e) determine the recharge amount according to the recharge amount information, f) generate a second recharge request that includes the recharge amount and the user account information, g) determine when a fund of the to-be-recharged virtual identity module is insufficient; and a transmitter configured to cooperate with the processor to:

(a) send the second recharge request to an operations support system of the to-be-recharged virtual identity module, which enables the operations support system of the to-be-recharged virtual identity module to deduct the recharge amount from an account associated with the user account information, and recharge the to-be-recharged virtual identity module and, (b) send the recharge recommendation description identifier and the recharge recommendation description information to the user equipment when the fund of the to-be-recharged virtual identity module is insufficient, which enables the user equipment to determine the recharge information according to the recharge recommendation description identifier and the recharge recommendation description information.

8. The device according to claim 7, wherein the recharge information comprises identity information of the to-be-recharged virtual identity module and recharge amount information; and the processor is further configured to:

(h) determine the to-be-recharged virtual identity module according to the identity information of the to-be-recharged virtual identity module; and (i) determine the recharge amount according to the recharge amount information.

9. The device according to claim 7, wherein the transmitter is further configured to:

(a) before the receiver receives the first recharge request, when a first virtual identity module corresponding to the user account is not used within a preset time period, and (b) a balance of a second virtual identity module corresponding to the user account is insufficient, send the recharge recommendation description identifier and the recharge recommendation description information to the user equipment, so that the user equipment is able to determine the recharge information according to the recharge recommendation description information and the recharge recommendation description identifier, wherein the second virtual identity module is the to-be-recharged virtual identity module, and the recharge recommendation description information comprises an identifier of the first virtual identity module; and before sending the second recharge request to the operations support system of the to-be-recharged virtual identity module, send a fund transfer-out request to an operations support system of the first virtual identity module, wherein the fund transfer-out request carries the user account information and a transfer-out amount, and the transfer-out amount is equal to the recharge amount, so that the operations support system of the first virtual identity module transfers the transfer-out amount to the account corresponding to the user account information.

10. The device according to claim 7, wherein the transmitter is further configured to: (a) before the receiver receives the first recharge request, when the to-be-recharged virtual user identity module has a favorable charge rate, (b) and a balance of the to-be-recharged virtual user identity module is lower than a preset amount, send the recharge recommendation description identifier and the recharge recommendation description information to the user equipment, so that the user equipment is able to determine the recharge information according to the recharge recommendation description identifier and the recharge recommendation description information.

11. The device according to claim 7, wherein the processor is further configured to:

(a) save a relationship between the recharge recommendation description identifier and the recharge recommendation description information after the recharge recommendation description identifier and the recharge recommendation description information are sent to the user equipment; and determine (a) the recharge recommendation description information according to the recharge recommendation description identifier determined by the user equipment, and (b) the relationship between the recharge recommendation description identifier and the recharge recommendation description information when determining recharge recommendation description information.

12. The device according to claim 7, wherein the receiver is further configured to:

receive a response message that is returned by the operations support system of the to-be-recharged virtual identity module after recharging is successful after the sender sends the second recharge request to the operations support system of the to-be-recharged virtual identity module; and record, according to the response message, a balance of the account corresponding to the user account information after recharge and a recharged account balance of the to-be-recharged virtual identity module in the operations support system, wherein the transmitter is further configured to send a recharge result to the user equipment, wherein the recharge result comprises an identifier and a balance of the recharged virtual identity module.

\* \* \* \* \*

UNITED STATES PATENT AND TRADEMARK OFFICE
CERTIFICATE OF CORRECTION

PATENT NO.        : 9,992,351 B2
APPLICATION NO.   : 15/035168
DATED             : June 5, 2018
INVENTOR(S)       : Li et al.

It is certified that error appears in the above-identified patent and that said Letters Patent is hereby corrected as shown below:

Replace title page with the attached title page.

Replace claims with the following claims:

1. A recharging method for a virtual identity module, the method comprising:
    receiving location information sent by user equipment, wherein the location information indicates a location of the user equipment;
    determining, according to the location information, that a to-be-recharged virtual identity module is available at the location of the user equipment;
    sending a recharge recommendation description identifier and a recharge recommendation description information to the user equipment when a fund of the to-be-recharged virtual identity module is insufficient;
    receiving a first recharge request sent by the user equipment that carries user account information and recharge information associated with the user equipment;
    determining a recharge amount according to the recharge information; and
    sending a second recharge request to an operations support system of the to-be-recharged virtual identity module, wherein the second recharge request carries the recharge amount and the user account information, which enables the operations support system of the to-be-recharged virtual identity module to deduct the recharge amount from an account associated with the user account information, and recharge the to-be-recharged virtual identity module.

2. The method according to claim 1, wherein the recharge information comprises identity information of the to-be-recharged virtual identity module and recharge amount information; and
    wherein determining the to-be-recharged virtual identity module and the recharge amount according to the recharge information comprises:
    determining the to-be-recharged virtual identity module according to the identity information of the to-be-recharged virtual identity module; and
    determining the recharge amount according to the recharge amount information.

Signed and Sealed this
Eighteenth Day of September, 2018

Andrei Iancu
*Director of the United States Patent and Trademark Office*

3. The method according to claim 1, wherein
before receiving the first recharge request, the method further comprises:
    when it is detected that (a) a first virtual identity module corresponding to the user account has not been in use within a preset time period, and (b) a balance of a second virtual identity module corresponding to the user account is insufficient, sending the recharge recommendation description identifier and the recharge recommendation description information to the user equipment, so that the user equipment determines the recharge information according to the recharge recommendation description identifier and the recharge recommendation description information, wherein the second virtual identity module is the to-be-recharged virtual identity module, and the recharge recommendation description information comprises an identifier of the first virtual identity module; and before sending the second recharge request to the operations support system of the to-be-recharged virtual identity module, the method further comprises:
    sending a fund transfer-out request to an operations support system of the first virtual identity module, wherein the fund transfer-out request carries the user account information and a transfer-out amount, and the transfer-out amount is equal to the recharge amount, so that the operations support system of the first virtual identity module transfers the transfer-out amount to the account corresponding to the user account information.

4. The method according to claim 1, wherein
before receiving the first recharge request, the method further comprises:
    when the to-be-recharged virtual user identity module has a favorable charge rate, and a balance of the to-be-recharged virtual user identity module is lower than a preset amount, sending the recharge recommendation description identifier and the recharge recommendation description information to the user equipment, so that the user equipment determines the recharge information according to the recharge recommendation description identifier and the recharge recommendation description information.

5. The method according to claim 1, wherein
    after sending the recharge recommendation description identifier and the recharge recommendation description information to the user equipment, the method further comprises:
        saving a relationship between the recharge recommendation description identifier and the recharge recommendation description information; and
        wherein determining the recharge recommendation description information according to the recharge recommendation description identifier determined by the user equipment comprises:
            determining the recharge recommendation description information according to the recharge recommendation description identifier determined by the user equipment, and the relationship between the recharge recommendation description identifier and the recharge recommendation description information.

CERTIFICATE OF CORRECTION (continued)
U.S. Pat. No. 9,992,351 B2

6. The method according to claim 1, wherein
after sending the second recharge request to the operations support system of the to-be-recharged virtual identity module, the method further comprises:
receiving a response message that is returned by the operations support system of the to-be-recharged virtual identity module after recharging is successful;
recording, according to the response message, a balance of the account corresponding to the user account information after recharge and a recharged account balance of the to-be-recharged virtual identity module in the operations support system; and
sending a recharge result to the user equipment, wherein the recharge result comprises an identifier and a balance of the recharged virtual identity module.

7. A recharging method for a virtual identity module, the method comprising:
detecting a geographical location of user equipment;
sending location information to a virtual identity module serving device when the geographical location of the user equipment changes, wherein the location information indicates a location of the user equipment and enables the virtual identity module serving device to determine that the to-be-recharged virtual identity module is at the location of the user equipment;
determining recharge information associated with the user equipment, wherein the recharge information identifies the to-be-recharged virtual identity module and a recharge amount, wherein determining recharge information comprises:
a) receiving a recharge recommendation information sent by the virtual identity module serving device when a fund of the to-be-recharged virtual identity module is insufficient;
b) presenting to a user of the user equipment the recharge recommendation information;
c) receiving a selection input made by the user according to the presented recharge recommendation information; and
d) determining a recharge recommendation description identifier of the recharge recommendation information corresponding to the selection input as the recharge information;
sending, to a virtual identity module serving device, a first recharge request that carries user account information and the recharge information, so that the virtual identity module serving device sends, to an operations support system of the to-be-recharged virtual identity module, a second recharge request that carries the recharge amount; and
receiving a recharge result sent by the virtual identity module serving device.

8. The method according to claim 7, wherein determining the recharge information comprises:
acquiring a recharge operation instruction input by a user, and determining the recharge information according to the recharge operation instruction, wherein the recharge information comprises identity information of the to-be-recharged virtual identity module and recharge amount information.

CERTIFICATE OF CORRECTION (continued)
U.S. Pat. No. 9,992,351 B2

9. The method according to claim 7, wherein determining recharge information comprises:
    receiving the recharge recommendation description identifier and the recharge recommendation description information that are sent by the virtual identity module serving device, wherein the recharge recommendation description information comprises an identifier of a first virtual identity module and an identifier of a second virtual identity module associated with a user account, wherein the first virtual identity module has not been in use within a preset time period, the to-be-recharged virtual identity module is the second virtual identity module corresponding to the user account, and a balance of the second virtual identity module is insufficient;
    presenting the recharge recommendation description information sent by the virtual identity module serving device;
    receiving a selection input that is made by a user according to the recharge recommendation description information sent by the virtual identity module serving device; and
    determining a recharge recommendation description identifier of the recharge recommendation description information corresponding to the selection input as the recharge information.

10. The method according to claim 7, wherein determining recharge information comprises:
    receiving the recharge recommendation description identifier and the recharge recommendation description information that are sent by the virtual identity module serving device when the to-be-recharged virtual user identity module has a favorable charge rate, and a balance of the to-be-recharged virtual user identity module is lower than a preset amount;
    presenting the recharge recommendation description information sent by the virtual identity module serving device;
    receiving a selection input that is made by a user according to the recharge recommendation description information sent by the virtual identity module serving device; and
    determining a recharge recommendation description identifier of the recharge recommendation description information corresponding to the selection input as the recharge information.

11. A virtual identity module serving device comprising:
    a receiver configured to (a) receive location information sent by user equipment, wherein the location information indicates a location of the user equipment, and (b) thereafter receive a first recharge request sent by the user equipment and that carries user account information and recharge information associated with the user equipment;
    a processor configured to:
        a) determine, according to the recharge information, a to-be-recharged virtual identity module and a recharge amount,
        b) determine, according to the location information, that the to-be-recharged virtual identity module is available at the location of the user equipment,
        c) determine, according to the recharge information, identity information of the to-be-recharged virtual identity module and recharge amount information, d) determine the to-be-recharged virtual identity module according to the identity information of the to-be-recharged virtual identity module,
e) determine the recharge amount according to the recharge amount information,
f) generate a second recharge request that includes the recharge amount and the user account information,
g) determine when a fund of the to-be-recharged virtual identity module is insufficient; and a transmitter configured to cooperate with the processor to:
(a) send the second recharge request to an operations support system of the to-be-recharged virtual identity module, which enables the operations support system of the to-be-recharged virtual identity module to deduct the recharge amount from an account associated with the user account information, and recharge the to-be-recharged virtual identity module and,
(b) send the recharge recommendation description identifier and the recharge recommendation description information to the user equipment when the fund of the to-be-recharged virtual identity module is insufficient, which enables the user equipment to determine the recharge information according to the recharge recommendation description identifier and the recharge recommendation description information.

12. The device according to claim 11, wherein the recharge information comprises identity information of the to-be-recharged virtual identity module and recharge amount information; and the processor is further configured to:
(h) determine the to-be-recharged virtual identity module according to the identity information of the to-be-recharged virtual identity module; and
(i) determine the recharge amount according to the recharge amount information.

13. The device according to claim 11, wherein the transmitter is further configured to:

(a) before the receiver receives the first recharge request, when a first virtual identity module corresponding to the user account is not used within a preset time period, and (b) a balance of a second virtual identity module corresponding to the user account is insufficient, send the recharge recommendation description identifier and the recharge recommendation description information to the user equipment, so that the user equipment is able to determine the recharge information according to the recharge recommendation description information and the recharge recommendation description identifier, wherein the second virtual identity module is the to-be-recharged virtual identity module, and the recharge recommendation description information comprises an identifier of the first virtual identity module; and before sending the second recharge request to the operations support system of the to-be-recharged virtual identity module, send a fund transfer-out request to an operations support system of the first virtual identity module, wherein the fund transfer-out request carries the user account information and a transfer-out amount, and the transfer-out amount is equal to the recharge amount, so that the operations support system of the first virtual identity module transfers the transfer-out amount to the account corresponding to the user account information.

14. The device according to claim 11, wherein the transmitter is further configured to: (a) before the receiver receives the first recharge request, when the to-be-recharged virtual user identity module has a favorable charge rate, (b) and a balance of the to-be-recharged virtual user identity module is lower than a preset amount, send the recharge recommendation description identifier and the recharge recommendation description information to the user equipment, so that the user equipment is able to determine the recharge information according to the recharge recommendation description identifier and the recharge recommendation description information.

15. The device according to claim 11, wherein the processor is further configured to:
    (a) save a relationship between the recharge recommendation description identifier and the recharge recommendation description information after the recharge recommendation description identifier and the recharge recommendation description information are sent to the user equipment; and
    determine (a) the recharge recommendation description information according to the recharge recommendation description identifier determined by the user equipment, and (b) the relationship between the recharge recommendation description identifier and the recharge recommendation description information when determining recharge recommendation description information.

16. The device according to claim 11, wherein the receiver is further configured to:
    receive a response message that is returned by the operations support system of the to-be-recharged virtual identity module after recharging is successful after the sender sends the second recharge request to the operations support system of the to-be-recharged virtual identity module; and
    record, according to the response message, a balance of the account corresponding to the user account information after recharge and a recharged account balance of the to-be-recharged virtual identity module in the operations support system,
    wherein the transmitter is further configured to send a recharge result to the user equipment, wherein the recharge result comprises an identifier and a balance of the recharged virtual identity module.

17. A use equipment comprising:
    output apparatus configured to present recharge recommendation information sent by a virtual identity module serving device;
    input apparatus configured to receive a selection made by a user according to the recharge recommendation information sent by the virtual identity module serving device;
    a processor configured to
        a) detect a geographical location of the user equipment,
        b) generate location information when the geographical location of the user equipment changes, wherein the location information indicates a location of the user equipment, which enables a virtual identity module serving device to determine, according to the location information, that a to-be-recharged virtual identity module is at the location of the user equipment, c) determine recharge information, wherein the recharge information includes an identifier of a to-be-recharged virtual identity module and recharge amount information, and d) generate a first recharge request that carries user account information and the recharge information, which enables the virtual identity module serving device to send to an operations support system of the to-be-recharged virtual a) identity module, a second recharge request that carries the recharge amount, b) determine a recharge recommendation description identifier of recharge recommendation description information corresponding to the selection input as the recharge information, a transmitter configured to send the first recharge request to the virtual identity module serving device; and a receiver configured to receive the recharge recommendation information sent by the virtual identity module serving device when a fund of the to-be-recharged virtual identity module is insufficient.

18. The user equipment according to claim 17, wherein the processor is configured to:

acquire a recharge operation instruction input by a user, and determine the recharge information according to the recharge operation instruction, wherein the recharge information comprises identity information of the to-be-recharged virtual identity module and recharge amount information.

19. The user equipment according to claim 17, wherein the receiver is further configured to:

receive the recharge recommendation description identifier and the recharge recommendation description information sent by the virtual identity module serving device, wherein (a) the recharge recommendation description information comprises an identifier of a first virtual identity module and an identifier of a second virtual identity module associated with a user account, (b) the first virtual identity module is not used within a preset time period, (c) the to-be-recharged virtual identity module is the second virtual identity module associated with the user account, and (d) a balance of the second virtual identity module is insufficient;

the user equipment further comprises:

an output configured to present the recharge recommendation description information sent by the virtual identity module serving device; and an input configured to receive a selection input that is made by a user according to the recharge recommendation description information sent by the virtual identity module serving device; and the processor is further configured to determine a recharge recommendation description identifier of the recharge recommendation description information corresponding to the selection input as the recharge information.

20. The user equipment according to claim 17, wherein the receiver is further configured to:

receive the recharge recommendation description identifier and the recharge recommendation description information sent by the virtual identity module serving device when (a) the to-be-recharged virtual user identity module has a favorable charge rate, and (b) a balance of the to-be-recharged virtual user identity module is lower than a preset amount;

the user equipment further comprises:

an output configured to present the recharge recommendation description information sent by the virtual identity module serving device; and an input configured to receive a selection input that is made by a user according to the recharge recommendation description information sent by the virtual identity module serving device; and the processor is further configured to determine a recharge recommendation description identifier of the recharge recommendation description information corresponding to the selection input as the recharge information.

(12) United States Patent
Li et al.

(10) Patent No.: US 9,992,351 B2
(45) Date of Patent: Jun. 5, 2018

(54) RECHARGING METHOD FOR VIRTUAL IDENTITY MODULE, AND DEVICE

(71) Applicant: Huawei Technologies Co., Ltd., Shenzhen (CN)

(72) Inventors: Zijun Li, Shenzhen (CN); Guoqiang Rong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/035,168

(22) PCT Filed: Nov. 8, 2013

(86) PCT No.: PCT/CN2013/086795
§ 371 (c)(1),
(2) Date: May 6, 2016

(87) PCT Pub. No.: WO2015/066900
PCT Pub. Date: May 14, 2015

(65) Prior Publication Data
US 2016/0286052 A1 Sep. 29, 2016

(51) Int. Cl.
*H04M 15/00* (2006.01)
*H04W 4/24* (2018.01)
(Continued)

(52) U.S. Cl.
CPC ...... *H04M 15/723* (2013.01); *H04L 12/1457* (2013.01); *H04L 12/1467* (2013.01);
(Continued)

(58) Field of Classification Search
CPC .. H04M 15/723; H04M 15/71; H04M 15/856; H04W 4/02
(Continued)

(56) References Cited

U.S. PATENT DOCUMENTS

| 2006/0004656 | A1* | 1/2006 | Lee | G06Q 20/04 705/39 |
| 2009/0132819 | A1* | 5/2009 | Lu | G06Q 20/10 713/169 |
| 2010/0153249 | A1* | 6/2010 | Yuan | G06Q 20/02 705/34 |
| 2010/0210304 | A1 | 8/2010 | Huslak | |

(Continued)

FOREIGN PATENT DOCUMENTS

| CN | 101222712 A | 7/2008 |
| CN | 101222723 A | 7/2008 |

(Continued)

*Primary Examiner* — Cong Tran
(74) *Attorney, Agent, or Firm* — Leydig, Voit & Mayer, Ltd.

(57) ABSTRACT

Embodiments of the present disclosure provide a recharging method for a virtual identity module, and a device. A first recharge request that is sent by user equipment and carries user account information and recharge information is received; a to-be-recharged virtual identity module and a recharge amount are determined according to the recharge information; a second recharge request is sent to an operations support system of the to-be-recharged virtual identity module, where the second recharge request carries the recharge amount and the user account information, so that the operations support system of the to-be-recharged virtual identity module deducts the recharge amount from an account corresponding to the user account information, and recharges the to-be-recharged virtual identity module. Recharging manners are diversified, and a recharging process is more flexible and convenient.

20 Claims, 15 Drawing Sheets